US009311518B2

(12) United States Patent
Rahmes et al.

(10) Patent No.: US 9,311,518 B2
(45) Date of Patent: Apr. 12, 2016

(54) SYSTEMS AND METHODS FOR EFFICIENT COMPARATIVE NON-SPATIAL IMAGE DATA ANALYSIS

(75) Inventors: Mark Rahmes, Melbourne, FL (US); Michael McGonagle, Melbourne, FL (US); J. Harlan Yates, Melbourne, FL (US); Rufus Williams, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 558 days.

(21) Appl. No.: 13/409,566

(22) Filed: Mar. 1, 2012

(65) Prior Publication Data

US 2013/0230219 A1    Sep. 5, 2013

(51) Int. Cl.
*G06K 9/00*    (2006.01)
*G06K 9/62*    (2006.01)

(52) U.S. Cl.
CPC .......... *G06K 9/00006* (2013.01); *G06K 9/6253* (2013.01)

(58) Field of Classification Search
USPC .................................................. 382/124, 125
See application file for complete search history.

(56) References Cited

U.S. PATENT DOCUMENTS

| 4,135,147 | A * | 1/1979 | Riganati et al. ............... 382/125 |
| 6,654,690 | B2 | 11/2003 | Rahmes et al. |
| 7,107,179 | B2 | 9/2006 | Malchi et al. |
| 7,376,513 | B2 | 5/2008 | Rahmes et al. |
| 7,391,899 | B2 | 6/2008 | Rahmes et al. |
| 7,702,016 | B2 | 4/2010 | Winder et al. |
| 7,732,768 | B1 * | 6/2010 | Haigh et al. .................. 250/332 |
| 7,804,982 | B2 * | 9/2010 | Howard et al. ............... 382/115 |
| 7,912,255 | B2 | 3/2011 | Rahmes et al. |
| 8,275,175 | B2 * | 9/2012 | Baltatu et al. ................. 382/118 |
| 8,390,684 | B2 | 3/2013 | Piran et al. |
| 8,655,107 | B2 * | 2/2014 | Okamoto ....................... 382/292 |
| 2003/0098869 | A1 | 5/2003 | Arnold et al. |
| 2003/0103659 | A1 * | 6/2003 | Hara et al. .................... 382/125 |
| 2003/0156824 | A1 | 8/2003 | Lu |
| 2004/0218099 | A1 | 11/2004 | Washington |
| 2006/0110128 | A1 | 5/2006 | Dunton et al. |
| 2006/0120624 | A1 | 6/2006 | Jojic et al. |
| 2006/0259856 | A1 | 11/2006 | Atkins |
| 2008/0279416 | A1 * | 11/2008 | Lo et al. ........................ 382/100 |

(Continued)

OTHER PUBLICATIONS

Lewis, P., et al., "Spatial Video and GIS", International Journal of Geographical Information Science, vol. 25, No. 5, May 2011, 697-716.

(Continued)

*Primary Examiner* — Ishrat I Sherali
(74) *Attorney, Agent, or Firm* — Fox Rothschild LLP; Robert J. Sacco; Carol E. Thorstad-Forsyth

(57) ABSTRACT

Systems (100) and methods (300, 400) for efficient comparative non-spatial image data analysis. The methods involve ranking a plurality of non-spatial images (1011, 1050, 1231, 1539, 0001, 0102, 0900, 1678, 0500, 0020, 0992, 1033, 1775, 1829) based on at least one first attribute thereof; generating a screen page (1102-1106) comprising an array (1206) defined by a plurality of cells (1208) in which at least a portion of the non-spatial images are simultaneously presented; and displaying the screen page in a first GUI window (802) of a display screen. Each cell comprises only one non-spatial image. The non-spatial images are presented in an order defined by the ranking thereof.

26 Claims, 17 Drawing Sheets

(56) References Cited

U.S. PATENT DOCUMENTS

| | | | |
|---|---|---|---|
| 2008/0319723 A1 | 12/2008 | Smith et al. | |
| 2009/0027417 A1 | 1/2009 | Horsfall et al. | |
| 2009/0109298 A1 | 4/2009 | Wan | |
| 2009/0219154 A1* | 9/2009 | Kukula et al. | 340/540 |
| 2010/0100835 A1 | 4/2010 | Klaric et al. | |
| 2010/0135540 A1* | 6/2010 | Cervantes | 382/117 |
| 2010/0172590 A1* | 7/2010 | Foehr et al. | 382/217 |
| 2010/0232659 A1 | 9/2010 | Rahmes et al. | |
| 2010/0239165 A1 | 9/2010 | Wu et al. | |
| 2011/0044513 A1 | 2/2011 | McGonagle et al. | |
| 2011/0044514 A1 | 2/2011 | Rahmes et al. | |
| 2011/0262013 A1 | 10/2011 | Rahmes et al. | |
| 2012/0017152 A1* | 1/2012 | Matsuda et al. | 715/723 |
| 2012/0272185 A1 | 10/2012 | Dodson et al. | |
| 2013/0044219 A1 | 2/2013 | Burry et al. | |
| 2013/0088600 A1 | 4/2013 | Wu et al. | |

OTHER PUBLICATIONS

Zhu, Z., "Geo-Mosaic for Environmental Monitoring", CUNY City CollegeVisual Computing Laboratory, http:/www-cs.ccny.cuny.edu/~zhu/geomosaic.html.

Schultz, H., et al., "A System for Real-Time Generation of Geo-referenced Terrain Models", Proceedings SPIE Symposium on Enabling Technologies for Law Enforcement, 2000. http:/citeseerx.ist.psu.edu/viewdoc/summary?doi=10.1.1.121.6475.

Oksanen, J., "Tracing the Gross Errorsof DEM. Visualization Techniques for Preliminary Quality Analysis", Proceedings of the 21st International Cartographic Conference (ICC), Durban, South Africa, Aug. 10-16, 2003.

Timmons, G., "Weed Mapping Hi-TEch Breakthrough for Invasive Plants", [online] Retrieved on Dec. 10, 2013. Retrieved from: http://www.nature.org/ourinitiatives/regions/northamerica/unitedstates/hawaii/explore/hi-tech-breakthrough-for-invasive-plants.xml.

Reiners, W., et al., "Statistical Evaluation of the Wymoning and Colorado Landcover Map Thermatic Accuracy Using Aerial Videography Techniques", May 2000, [online]. Retrieved from: https://ndis1.nrel.colostate.edu/cogap/reprot/colandcov_acc. pdf.

Souris, M., "Aerial Videography; Principles and Guidelines of Implementation"; Aerial Videography—UNHRC-RD (ex-Orstom), 1999, pp. 1-54.

Slaymaker, D., "Using Georeferenced Large-Scale Aerial Videography as a Surrogate for Gound Validation Data", [online] Retrieved on Dec. 10, 2013; from: http://link.springer.com/chapter/10.1007%2F978-1-4615-0306-4_18#.

Ambagis, S., Et al., "Very High-resolutaion Imagery for Remote Sensing in Hawaii", Progress on the CAO Hyperpectral / LIDAR Imagery Project, [online] Retrived on Dec. 10, 2013; http://www.slideshare.net/higicc/progress-on-the-cao-hyperspectral-lidar-imagery-project.

Information about Related Patents and Patent Applications, see section 6 of the accompanying Information Disclosure Statement Letter, which concerns Related Patents and Patent Applications.

(Authors Unknown), Simple random sample, Wikipedia entry, as archived on Dec. 14, 2010, 18 pages as retrieved from http://en.wikipedia.org/w/index/php?title_Simple_random_sample&oldid=402414410 on Apr. 19, 2015, 3 pages.

Neteler and Mitasova, "Open Source GIS: GIS Approach" 2008, Third Ed. The International Series in Engineering and Computer Science, Springer, New York, vol. 773, 417 pages, 80 illus.

* cited by examiner

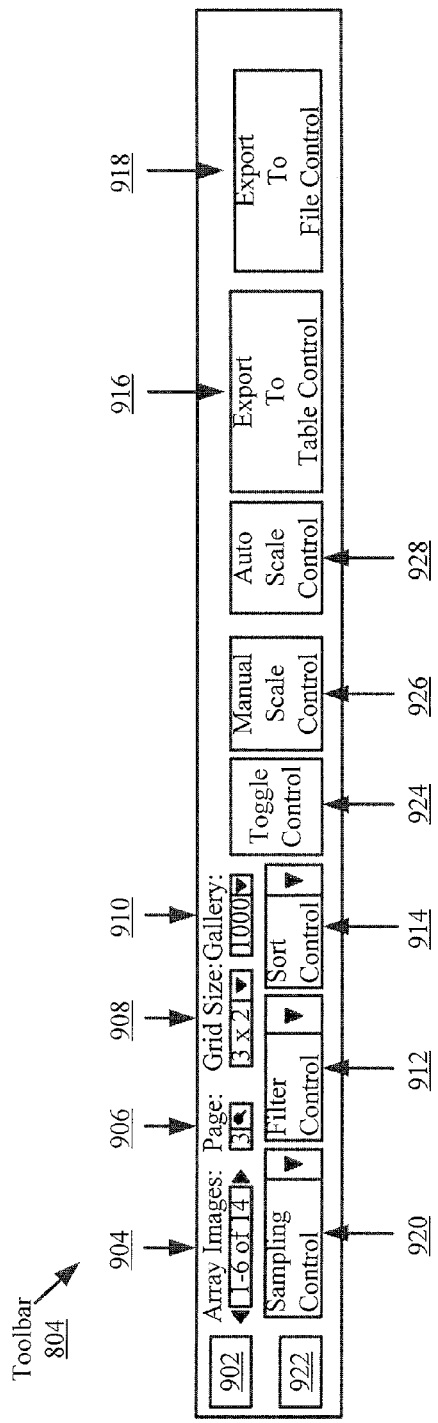
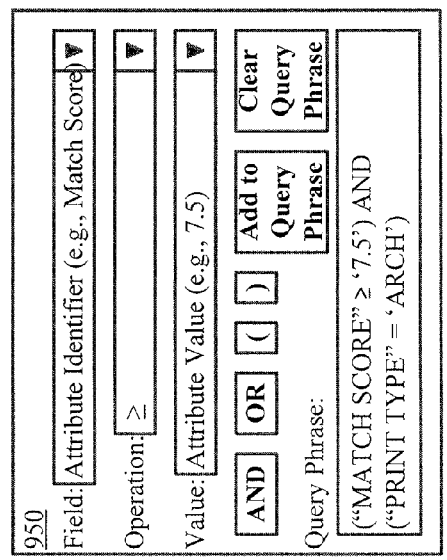
FIG. 9A
FIG. 9B

| Ranked List of Top Candidate Images | 1000 |
|---|---|
| 1. Non-Spatial Image 1011 | Match Score 9.98 |
| 2. Non-Spatial Image 1050 | Match Score 9.90 |
| 3. Non-Spatial Image 1231 | Match Score 9.89 |
| 4. Non-Spatial Image 1539 | Match Score 9.83 |
| 5. Non-Spatial Image 0001 | Match Score 9.80 |
| 6. Non-Spatial Image 0102 | Match Score 9.80 |
| 7. Non-Spatial Image 0900 | Match Score 9.79 |
| 8. Non-Spatial Image 1678 | Match Score 9.75 |
| 9. Non-Spatial Image 0500 | Match Score 9.73 |
| 10. Non-Spatial Image 0020 | Match Score 9.72 |
| 11. Non-Spatial Image 0992 | Match Score 9.72 |
| 12. Non-Spatial Image 1033 | Match Score 9.70 |
| 13. Non-Spatial Image 1775 | Match Score 8.2 |
| 14. Non-Spatial Image 1829 | Match Score 7.7 |

FIG. 10

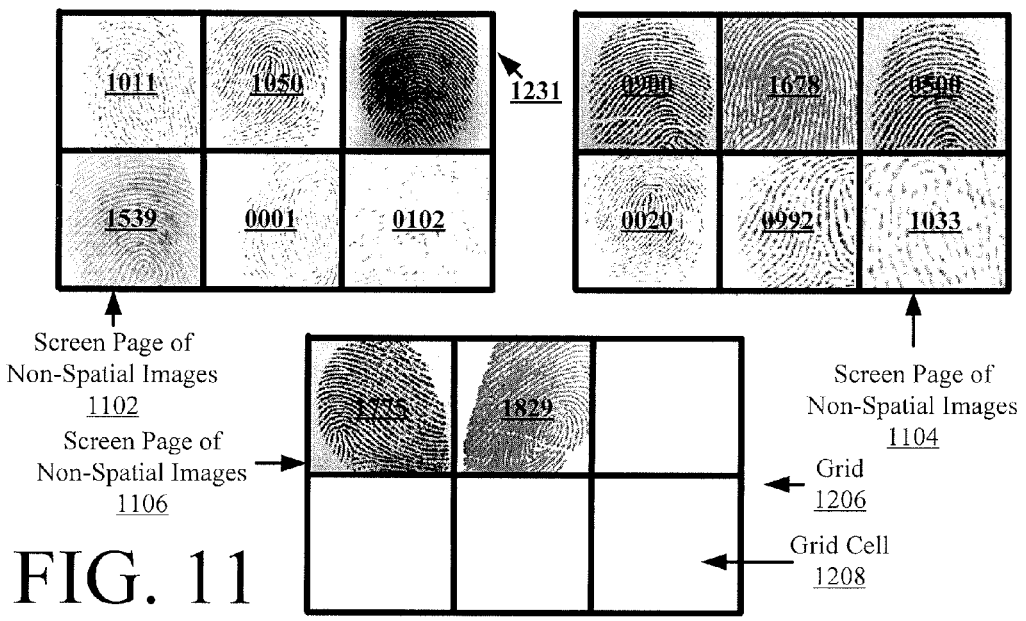

FIG. 11

SYSTEMS AND METHODS FOR EFFICIENT COMPARATIVE NON-SPATIAL IMAGE DATA ANALYSIS

BACKGROUND OF THE INVENTION

1. Statement of the Technical Field

The invention concerns computing systems. More particularly, the invention concerns computing systems and methods for efficient comparative non-spatial image data analysis.

2. Description of the Related Art

Biometric systems are often used to identify individuals based on their unique traits in many applications. Such applications include security applications and forensic applications. During operation, the biometric systems collect biometric image data defining images comprising visual representation of physical biometric markers. The physical biometric markers include facial features, fingerprints, hand geometries, irises and retinas. Physical biometric markers are present in most individuals, unique to the individuals, and permanent throughout the lifespan of the individuals.

The identity of a person can be determined by an expert technician using an Automatic Biometric Identification System ("ABIS"). The ABIS generally compares a plurality of biometric images to a reference biometric image to determine the degree of match between content thereof. Thereafter, the ABIS computes a match score for each of the plurality of biometric images. Biometric images with match scores equal to or greater than a threshold value are selected as candidate biometric images. The expert technician then reviews the candidate biometric images for purposes of identifying the individual comprising the physical biometric marker visually represented within the reference biometric image. This expert review typically involves a manual one-to-one examination of the reference biometric image to each of the candidate biometric images. Often times, there are a relatively large number of candidate biometric images that need to be reviewed by the expert technician. As such, the identification process may take a considerable amount of time and resources to complete.

SUMMARY OF THE INVENTION

Embodiments of the present invention concern implementing systems and methods for efficient comparative non-spatial image data analysis. The methods involve ranking a plurality of non-spatial images based on at least one first attribute thereof; generating a screen page comprising an array defined by a plurality of cells in which at least a portion of the non-spatial images are simultaneously presented; and displaying the screen page in a first GUI window of a display screen. Each cell comprises only one non-spatial image. The non-spatial images are presented in an order defined by the ranking thereof.

BRIEF DESCRIPTION OF THE DRAWINGS

Embodiments will be described with reference to the following drawing figures, in which like numerals represent like items throughout the figures, and in which:

FIG. 9A is a schematic illustration of an exemplary toolbar of a plug-in window.

FIG. 9B is a schematic illustration of an exemplary drop down box of a toolbar.

FIG. 10 is schematic illustration of an exemplary list of "best candidate" fingerprint images.

FIG. 11 is a schematic illustration of exemplary screen pages of fingerprint images.

DETAILED DESCRIPTION

Figure 1:
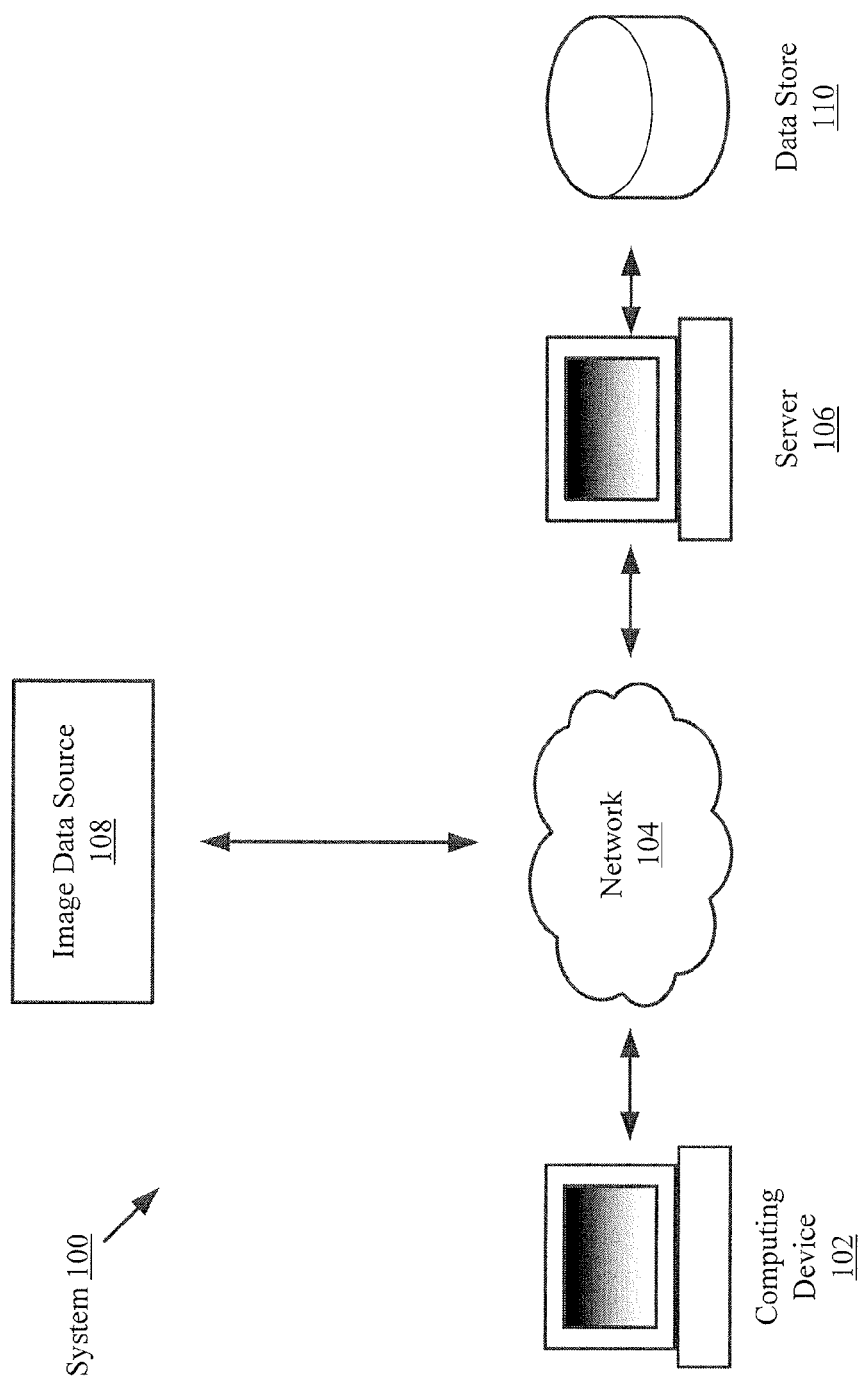
FIG. 1 is a schematic illustration of an exemplary system.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for efficient comparative non-spatial image data analysis. Non-spatial image data comprises data defining one or more images. Non-spatial data is absent of geographical data (e.g., longitude data, latitude data, and altitude data). In this regard, the present invention implements various automated feature-driven operations for facilitating the simultaneous visual inspection of numerous non-spatial images. These feature-driven operations will become more evident as the discussion progresses. Still, it should be understood that the present invention overcomes various drawbacks of conventional comparative non-spatial image analysis techniques, such as those described above in the background section of this document. For example, the present invention provides more efficient, less time consuming and less costly comparative non-spatial image analysis processes as compared to those of conventional comparative non-spatial image analysis techniques.

The present invention can be used in a variety of applications. Such applications include, but are not limited to, security applications, criminal investigation applications, forensic applications, user authentication applications, and any other application in which the content of two or more images needs to be compared. Exemplary implementing system embodiments of the present invention will be described below in relation to FIGS. 1, 2, 6, 8 and 9A-9B. Exemplary method embodiments of the present invention will be described below in relation to FIGS. 3-24.

Notably, the present invention will be described below in relation to fingerprint images. Embodiments of the present invention are not limited in this regard. For example, the present invention can be used with any type of non-spatial images (e.g., biometric images of facial features, hands, irises and/or retinas).

Also, the present invention will be described below in relation to a plug-in implementation. Embodiments of the present invention are not limited in this regard. The present invention can alternatively be implemented as a software application, rather than as a software component of a larger software application.

Exemplary Systems

Referring now to FIG. 1, there is provided a block diagram of an exemplary system 100. The system 100 comprises at least one computing device 102, a network 104, at least one server 106, at least one image data source 108, and at least one data store 110. The system 100 may include more, less or different components than those illustrated in FIG. 1. However, the components shown are sufficient to disclose an illustrative embodiment implementing the present invention.

The hardware architecture of FIG. 1 represents one embodiment of a representative system configured to facilitate the identification of an individual from a group of individuals. As such, system 100 implements methods for uniquely recognizing humans based upon one or more intrinsic physical traits. This human recognition is achieved using biometric identifiers. The biometric identifiers are distinctive, measurable physical characteristics of humans. Such physical characteristics include, but are not limited to, fingerprints, facial features, hand geometries, irises, and retinas.

During operation, the system 100 operates in an identification mode. In this mode, operations are performed for automatically comparing a plurality of non-spatial images (e.g., fingerprint images) to a reference non-spatial image (e.g., fingerprint image). The image comparison is performed to identify candidate images comprising content that is the same as or substantially similar to the content of the reference non-spatial image. Thereafter, a technician visually reviews the candidate images to determine if they were correctly identified as comprising content that is the same as or substantially similar to the content of the reference non-spatial image. If a candidate image was correctly identified, then the technician performs user-software interactions to indicate to an expert that the candidate image should be manually analyzed thereby. If a candidate image was incorrectly identified, then the technician performs operations for removing the image from the set of candidate images such that the candidate image will not be subsequently manually analyzed by an expert.

The image analysis performed by the technician is facilitated by a software application installed on the computing device 102. The software application implements a method for efficient non-spatial image data analysis in accordance with embodiments of the present invention. The method will be described in detail below in relation to FIGS. 3-20. However, it should be understood that the method implements a feature driven approach for enabling an efficient evaluation of non-spatial image data. The phrase "image data", as used herein, refers to data defining one or more images. Each image includes, but is not limited to, a non-spatial image. For example, the image is a fingerprint image or other biometric image.

The image data is stored in one or more data stores 110. The image data is collected by the image data source 108. The image data source 108 can include, but is not limited to, a biometric scanner. Also, the image data can be communicated to the data store 110 via network 104 and server 106.

Figure 2:
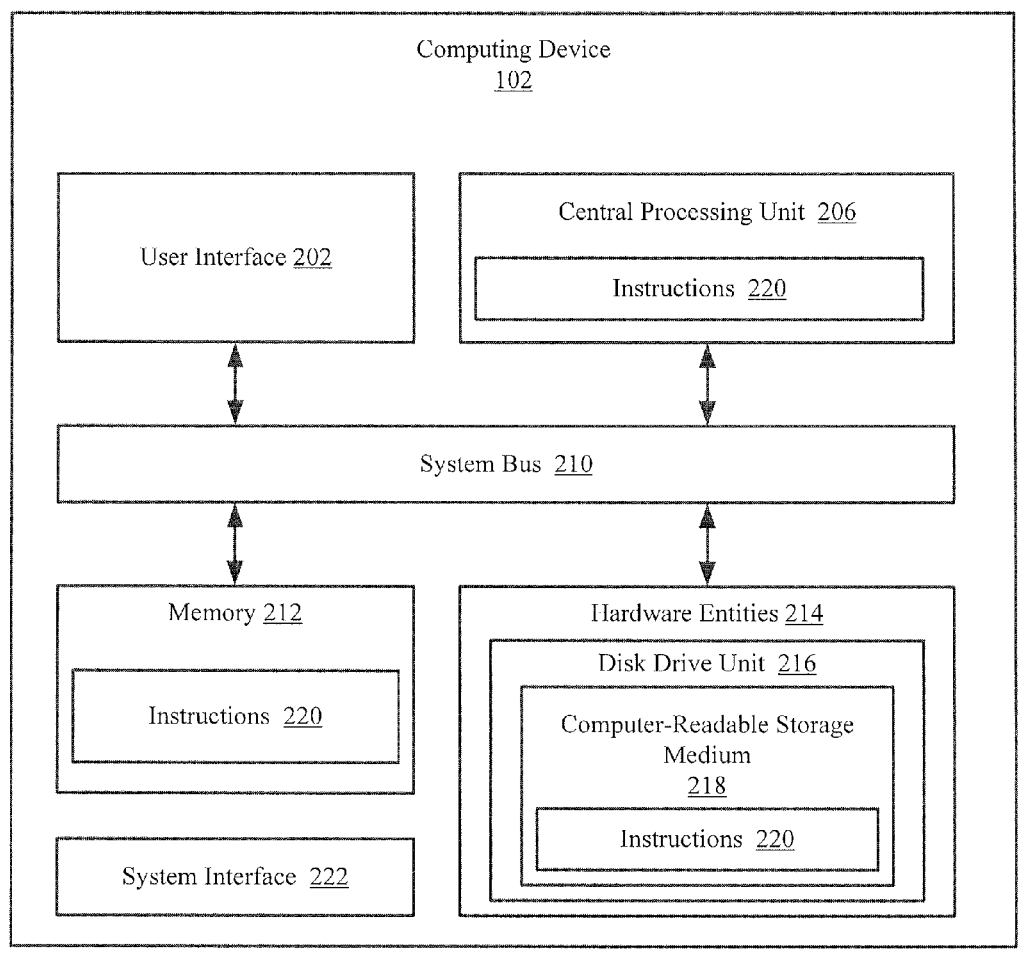
FIG. 2 is a block diagram of an exemplary computing device.

Referring now to FIG. 2, there is provided a block diagram of an exemplary embodiment of the computing device 102. The computing device 102 can include, but is not limited to, a notebook, a desktop computer, a laptop computer, a personal digital assistant, and a tablet PC. The server 106 of FIG. 1 can be the same as or similar to computing device 102. As such, the following discussion of computing device 102 is sufficient for understanding server 106 of FIG. 1. Notably, some or all of the components of the computing device 102 can be implemented as hardware, software and/or a combination of hardware and software. The hardware includes, but is not limited to, one or more electronic circuits.

Notably, the computing device 102 may include more or less components than those shown in FIG. 2. However, the components shown are sufficient to disclose an illustrative embodiment implementing the present invention. The hardware architecture of FIG. 2 represents one embodiment of a representative computing device configured to facilitate non-spatial image analysis in an efficient manner. As such, the computing device 102 of FIG. 2 implements improved methods for non-spatial image analysis in accordance with embodiments of the present invention.

As shown in FIG. 2, the computing device 102 includes a system interface 222, a user interface 202, a Central Processing Unit ("CPU") 206, a system bus 210, a memory 212 connected to and accessible by other portions of computing device 102 through system bus 210, and hardware entities 214 connected to system bus 210. At least some of the hardware entities 214 perform actions involving access to and use of memory 212, which can be a Random Access Memory ("RAM"), a disk driver and/or a Compact Disc Read Only Memory ("CD-ROM").

System interface 222 allows the computing device 102 to communicate directly or indirectly with external communication devices (e.g., server 106 of FIG. 1). If the computing device 102 is communicating indirectly with the external communication device, then the computing device 102 is sending and receiving communications through a common network (e.g., the network 104 shown in FIG. 1).

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 102 and that cause the computing device 102 to perform any one or more of the methodologies of the present disclosure.

In some embodiments of the present invention, the hardware entities 214 include an electronic circuit (e.g., a processor) programmed for facilitating efficient non-spatial data analysis through data-driven non-spatial sampling and data-driven non-spatial re-expansion of image data. In this regard, it should be understood that the electronic circuit can access and run Image Analysis and Editing ("IAE") software applications (not shown in FIG. 2), feature analysis plug-ins (not shown in FIG. 2) and other types of applications installed on the computing device 102. The IAE software applications are generally operative to facilitate the display of images in an application window, the one-to-one comparison of two images, and the editing of displayed images. An image may be edited to fill in missing data. The listed functions and other functions implemented by the IAE software applications are well known in the art, and therefore will not be described in detail herein. A schematic illustration of an exemplary application window 604 is provided in FIG. 6.

The feature analysis plug-ins are generally operative to display a plug-in window on a display screen of the computing device 102. A schematic illustration of an exemplary plug-in window 802 is provided in FIG. 8. Various types of information can be presented in the plug-in window. Such information includes, but is not limited to, non-spatial images and feature attributes. The feature attributes can include, but are not limited to, calculated attributes and tagged attributes of an object or item (e.g., a fingerprint) which is visually represented in a non-spatial image.

The calculated attributes include, but are not limited to, match scores indicating the amount of matching between the content of at least two non-spatial images. The match score can be a minutiae match score and/or a topographical match score. A minutiae match score indicates how many minutiae of at least two images match each other (i.e., minutiae points that are of the same type and reside at the same or similar locations in an image). In a fingerprint image scenario, the minutiae includes, but is not limited to, ridge endings, spurs, and bifurcations. A topographical match score indicates how many minutiae points are common between at least two images and/or how many common minutiae points of at least two images have the same or substantially similar number of ridges connected thereto. Algorithms for computing match scores are well known in the art, and therefore will not be described herein. Any such algorithm can be used with the present invention without limitation.

The tagged attributes include, but are not limited to, a print type (e.g., arch, loop, and/or whorl), a number of minutiae, minutiae characteristics (e.g., diameters, length, widths and areas), a number of ridges, a number of broken ridges, the presence of a core in a fingerprint, an area of a fingerprint, a contrast of an image, a brightness of an image, an intensity of an image, the number of ridges that are recommended by an algorithm as connecting or not connecting, the number of pores that are in a fingerprint, the number of pores that were filled, and other quality metrics.

The feature analysis plug-ins are also operative to simultaneously display a plurality of non-spatial images in a Graphical User Interface ("GUI") window in response to a user software interaction. The non-spatial images can be displayed as an array on a screen page. The array can include, but is not limited to, a grid or a matrix defined by a plurality of cells. Each cell has a non-spatial image presented therein. The non-spatial image of each cell can be different than the non-spatial images presented in all other cells of the array. Notably, the speed of non-spatial image analysis is accelerated by this image array configuration of the present invention. For example, if an array is defined by ten rows of cells and ten columns of cells, then a maximum of one hundred images can be presented therein. In this scenario, the non-spatial image analysis is performed up to one hundred times faster than a conventional one-to-one non-spatial image comparison analysis.

The feature analysis plug-ins are further operative to perform at least one of the following operations: update the content of an application window to comprise the same content of a selected one of a plurality of non-spatial images displayed in a plug-in window; sort a plurality of non-spatial images based on at least one attribute of the content thereof (e.g., a match score); generate and display at least one screen page of non-spatial images which are arranged in a sorted order; filter non-spatial images based on at least one attribute of the content thereof (e.g., print type); randomly select and display only a percentage of a plurality of non-spatial images; change a grid size in response to a user software interaction; change a zoom level of scale or resolution of displayed non-spatial images in response to a user software interaction; pan a non-spatial image displayed in an application window such that a feature (e.g., an arch, a loop, a whorl, or a ridge) of a non-spatial image displayed in a plug-in window is shown in the application window; zoom a non-spatial image displayed in an application window such that a feature of a non-spatial image of a plug-in window is shown at a particular zoom resolution within the application window; toggle the content of at least one cell of an array of a screen page between two non-spatial images; generate color coded non-spatial images comprising difference indications indicating differences between the content thereof; update the content of a screen page to include at least one of the color coded non-spatial images; toggle the content of at least one cell of an array of a screen page between two color coded non-spatial images; generate and display images comprising areas that are common to two or more non-spatial images; mark non-spatial images in response to user software interactions; unmark non-spatial images in response to user software interactions; and remember various settings that a user sets for each feature class (e.g., arches, loops, whorls and ridges) during at least one session. The listed functions and other functions of the feature analysis plug-ins will become more apparent as the discussion progresses. Notably, one or more of the functions of the feature analysis plug-ins can be accessed via a toolbar, menus and other GUI elements of the plug-in window.

A schematic illustration of an exemplary toolbar 804 of a plug-in window (e.g., plug-in window 802 of FIG. 8) is provided in FIG. 9A. As shown in FIG. 9A, the toolbar 804 comprises a plurality of exemplary GUI widgets 902-928. Each of the GUI widgets 902-928 is shown in FIG. 9A as a particular type of GUI widget. For example, GUI widget 910 is shown as a drop down menu. Embodiments of the present invention are not limited in this regard. The GUI widgets 902-928 can be of any type selected in accordance with a particular application.

GUI widget 902 is provided to facilitate the display of an array of non-spatial images including features of a user selected feature class (e.g., a particular minutiae type). The array of non-spatial images is displayed in the display area (e.g., display area 806 of FIG. 8) of the plug-in window (e.g., plug-in window 802 of FIG. 8) in a grid format. In some embodiments, the GUI widget 902 includes, but is not limited to, a drop down list that is populated with the feature classes identified in a previously generated feature list. Drop down lists are well known in the art, and therefore will not be described herein.

GUI widget 904 is provided to facilitate moving through screen pages of non-spatial images. If there are more than the maximum number of non-spatial images of interest that can fit in a grid of a selected grid size (e.g., three cells by two cells), then the feature analysis plug-in generates a plurality of screen pages of non-spatial images. Each screen page of non-spatial images includes a grid with non-spatial images contained in the cells thereof. As shown in the embodiment of FIG. 9A, the GUI widget 904 includes, but is not limited to, a text box, a forward arrow button and a backward arrow button. Text boxes and arrow buttons are well known in the art, and therefore will not be described herein. This configuration of the GUI widget 904 allows a user to move forward and backward through the screen pages of non-spatial images. Paging forward or backward will cause the non-spatial image in an upper left corner grid cell of the new screen page to be selected. The screen page context is displayed in the text box as the numerical range of non-spatial images displayed (e.g., non-spatial images one through nine) and the total number of non-spatial images of interest (e.g., fourteen).

GUI widget 906 is provided to facilitate jumping to a desired screen page of non-spatial images for review. As shown in the embodiment of FIG. 9A, GUI widget 906 includes, but is not limited to, a text box and a search button. The text box is a box in which to enter a screen page number (e.g., three). Clicking the search button will cause the screen page of non-spatial images having the entered screen page number to be displayed in the display area (e.g., display area 806 of FIG. 8) of the plug-in window (e.g., plug-in window 802 of FIG. 8).

GUI widget 908 is provided to facilitate a selection of a grid size from a plurality of pre-defined grid sizes. As shown in FIG. 9A, the GUI widget 908 includes, but is not limited to, a drop down list listing a plurality of pre-defined grid sizes. In some embodiments, the pre-defined grid sizes include one cell by one cell, two cells by two cells, three cells by three cells, four cells by four cells, five cells by five cells, six cells by six cells, seven cells by seven cells, eight cells by eight cells, nine cells by nine cells, and ten cells by ten cells. The grid size of two cells by two cells ensures that a maximum of four non-spatial images will be simultaneously or concurrently displayed in the display area of the plug-in window. The grid size of three cells by three cells ensures that a maximum of nine non-spatial images will be simultaneously or concurrently displayed in the display area of the plug-in window. The grid size of four cells by four cells ensures that a maximum of sixteen non-spatial images will be simultaneously or concurrently displayed in the display area of the plug-in window. The grid size of five cells by five cells ensures that a maximum of twenty-five non-spatial images will be simultaneously or concurrently displayed in the display area of the plug-in window. The grid size of six cells by six cells ensures that a maximum of thirty-six non-spatial images will be simultaneously or concurrently displayed in the display area of the plug-in window. The grid size of seven cells by seven cells ensures that a maximum of forty-nine non-spatial images will be simultaneously or concurrently displayed in the display area of the plug-in window. The grid size of eight cells by eight cells ensures that a maximum of sixty-four non-spatial images will be simultaneously or concurrently displayed in the display area of the plug-in window. The grid size of nine cells by nine cells ensures that a maximum of eighty-one non-spatial images will be simultaneously or concurrently displayed in the display area of the plug-in window. The grid size of ten cells by ten cells ensures that a maximum of one hundred non-spatial images will be simultaneously or concurrently displayed in the display area of the plug-in window. Embodiments of the present invention are not limited to grids having an equal number of cells in the rows and columns thereof. For example, a grid can alternatively have a grid size of four cells by three cells such that each column thereof comprises four cells and each row thereof comprises three cells, or vice versa.

Notably, the display area for each non-spatial image is different for each grid size. For example, the display area for each non-spatial image in a grid having a grid size of two cells by two cells is larger than the display area for each non-spatial image in a grid having a grid size of three cells by three cells. Also, if each non-spatial image has the same zoom level of scale or resolution, then the portion of a non-spatial image contained in a non-spatial image displayed in a two cell by two cell grid may be larger than the portion of a non-spatial image contained in a non-spatial image displayed in a three cell by three cell grid. It should also be noted that, in some embodiments, a selected non-spatial image of a first grid will reside in an upper left corner cell of a second grid having an enlarged or reduced grid size.

Figure 8:
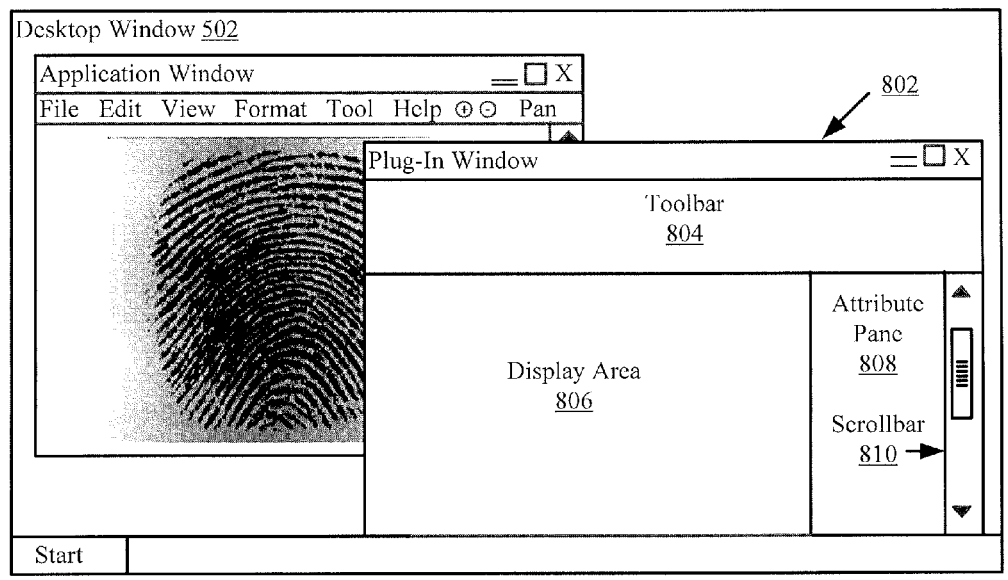
FIG. 8 is a schematic illustration of an exemplary plug-in window.
Figure 12:
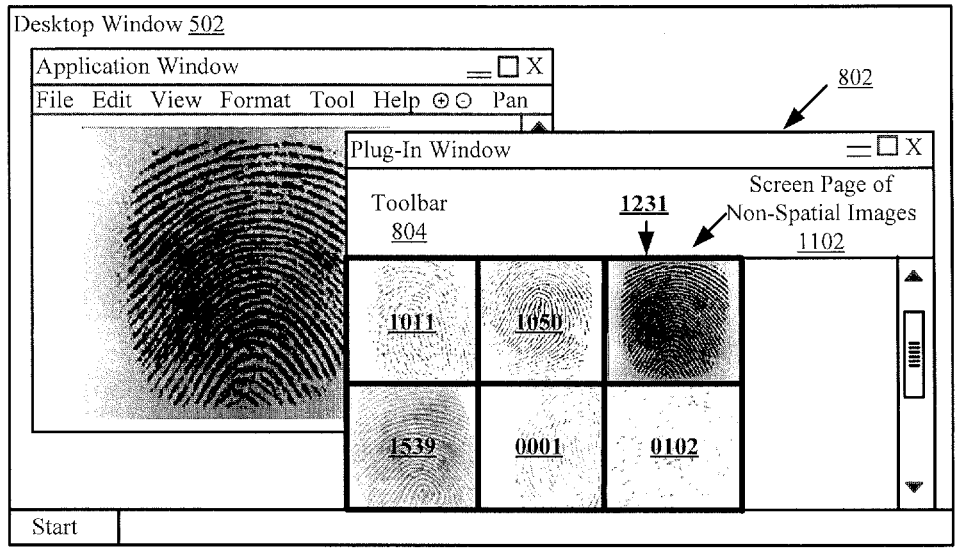
FIG. 12 is a schematic illustration of an exemplary displayed screen page of fingerprint images.

GUI widget 912 is provided to facilitate a selection of non-spatial images for display in the display area (e.g., display area 806 of FIG. 8) of the plug-in window (e.g., plug-in window 802 of FIG. 8) based on attributes of the content thereof. As shown in FIG. 8A, the GUI widget 812 includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["MATCH SCORE"≥'7.5'] and/or ["PRINT TYPE"='ARCH']. A schematic illustration of an exemplary drop-down box 950 is provided in FIG. 9B.

When the attribute filter function is enabled, the query phrase takes effect immediately.

Notably, the feature analysis plug-in remembers the filter query phrase that a user sets for each feature class during a session. Accordingly, if the user changes a feature class from a first feature class (e.g., arches) to a second feature class (e.g., whorls) during a session, then the previously set filter query for the second feature class will be restored. Consequently, only non-spatial images of the second feature class (e.g., whorls) which have the attribute specified in the previously set filter query (e.g., ["MATCH SCORE"≥'7.5']) will be displayed in the plug-in window.

GUI widget 914 is provided to facilitate the sorting of non-spatial images based on one or more calculated attributes thereof and/or one or more tagged attributes thereof. For example, a plurality of non-spatial images are sorted into an ascending or descending order based on the values of match scores thereof and/or print types associated therewith. As shown in FIG. 9A, the GUI widget 914 includes a drop down list. Embodiments of the present invention are not limited in this regard. For example, the GUI widget 914 can alternatively include a button and a drop down arrow for accessing a drop down box. The button facilitates the enablement and disablement of a sorting function of the feature analysis plug-in. The drop down box allows a user to define settings for sorting non-spatial images based on one or more attributes thereof. As such, the drop down box may include a list from which an attribute can be selected from a plurality of attributes. The drop down box may also include widgets for specifying whether the non-spatial images should be sorted in an ascending order or a descending order.

Notably, the feature analysis plug-in remembers the sort settings that a user defines for each feature class during a session. Accordingly, if the user changes a feature class from a first feature class (e.g., arches) to a second feature class (e.g., whorls) during a session, then the previously defined sort settings for the second feature class will be restored. Consequently, non-spatial images containing features of the second feature class (e.g., whorls) will be displayed in a sorted order in accordance with the previously defined sort settings.

GUI widget 920 is provided to facilitate the display of a random sample of non-spatial images for visual inspection. As such, the GUI widget 920 includes, but is not limited to, a button for enabling/disabling a random sampling function of the feature analysis plug-in and a drop down menu from which a percentage value can be selected.

GUI widget 910 is provided to facilitate the selection of a non-spatial image gallery from a plurality of non-spatial image galleries. As shown in FIG. 9A, the GUI widget 910 includes, but is not limited to, a text box and a drop down list populated with the names of image galleries. If a user selects a new item from the drop down list, then the feature analysis plug-in generates and displays at least one screen page of non-spatial images contained in the gallery indentified by the newly selected item. The text box displays information identifying the gallery to which the currently displayed non-spatial images belong. The contents of the text box can be updated in response to a user selection of a new item from the drop down list.

GUI widget 922 is provided to facilitate the generation and display of color coded non-spatial images. A user may want to view color coded non-spatial images for purposes of quickly seeing similarities and/or differences between the content of two or more non-spatial images. For example, a user may want to view a color coded candidate fingerprint image and a color coded reference fingerprint image for purposes of speeding up an fingerprint comparison task. In this scenario, the data of the candidate fingerprint can be color coded such that red portions thereof indicate content that is the same as or different than the content of the reference fingerprint image. Similarly, the data of the reference fingerprint image can be color coded such that green portions thereof indicate content that is the same as or different than the content of the candidate fingerprint image. Accordingly, GUI widget 922 includes, but is not limited to, a check box for enabling and disabling color coding operations of the feature analysis plug-in and a drop down menu for selecting one or more array cells whose content should be changed to include a color coded non-spatial image.

Notably, in some embodiments of the present invention, a non-spatial image can also be color coded by right clicking on the image to obtain access to an "image context" GUI and selecting a "color code" item from the "image context" GUI.

GUI widget 924 is provided to facilitate the toggling of the content of all cells of an array of a displayed screen page between two non-spatial images (e.g., a candidate fingerprint image and a reference fingerprint image). A user may want to toggle between non-spatial images for similarity or difference detection purposes. The GUI widget 924 is configured to allow manual toggling and/or automatic toggling between non-spatial images. As such, the GUI widget 924 includes, but is not limited to, a check box for enabling and disabling image toggling operations of the feature analysis plug-in, a slider for setting the rate at which the content of array cells automatically changes, and/or a button for manually commanding when to change the content of array cells. Notably, in some embodiments of the present invention, the content of a single array cell can be toggled between two non-spatial images by right clicking on the array cell to obtain access to an "image context" GUI and selecting a "toggle" item from the "image context" GUI.

GUI widget 926 is provided to facilitate the performance of manual-scale operations by the feature analysis plug-in. The manual-scale operations are operative to adjust the zoom level of scale of all of the displayed non-spatial images from a first zoom level of scale to a second zoom level of scale in response to a user-software interaction. The first zoom level of scale is a default zoom level of scale (e.g., 100%) or a previously user-selected zoom level of scale (e.g., 50%). The second zoom level of scale is a new user-selected zoom level of scale (e.g., 75%). As such, the GUI widget 926 includes, but is not limited to, a drop down list populated with a plurality of whole number percentage values. The percentage values include, but are not limited to, whole number values between zero and one hundred.

GUI widget 928 is provided to facilitate the viewing of each displayed non-spatial image at its best-fit zoom level of scale or its pre-defined maximum zoom level of scale. As such, the GUI widget 928 includes, but is not limited to, a button for enabling and disabling auto-scale operations of the feature analysis plug-in. When the auto-scale operations are enabled, the manual-scale operations are disabled. Similarly, when the auto-scale operations are disabled, the manual-scale operations are enabled.

GUI widget 916 is provided to facilitate the writing of all "marked or annotated" non-spatial images to an output file stored in a specified data store (e.g., data store 110 of FIG. 1). GUI widget 918 is provided to facilitate the saving of all non-spatial images which have been "marked or annotated" during a session to a user-named file. In some embodiments of the present invention, a non-spatial image is "marked or annotated" by right clicking on the image to obtain access to an "image context" GUI and selecting a "mark or annotate" item from the "image context" GUI.

As evident from the above discussion, the system 100 implements one or more method embodiments of the present invention. The method embodiments of the present invention provide implementing systems with certain advantages over conventional non-spatial image data analysis systems. For example, the present invention provides a system in which an analysis of non-spatial image data can be performed in a shorter period of time as compared to the amount of time needed to analyze non-spatial image data using conventional one-to-one comparison techniques. The present invention also provides a system in which non-spatial image data is analyzed much more efficiently than in conventional non-spatial image data analysis systems. The manner in which the above listed advantages of the present invention are achieved will become more evident as the discussion progresses.

Exemplary Methods

Figure 3:
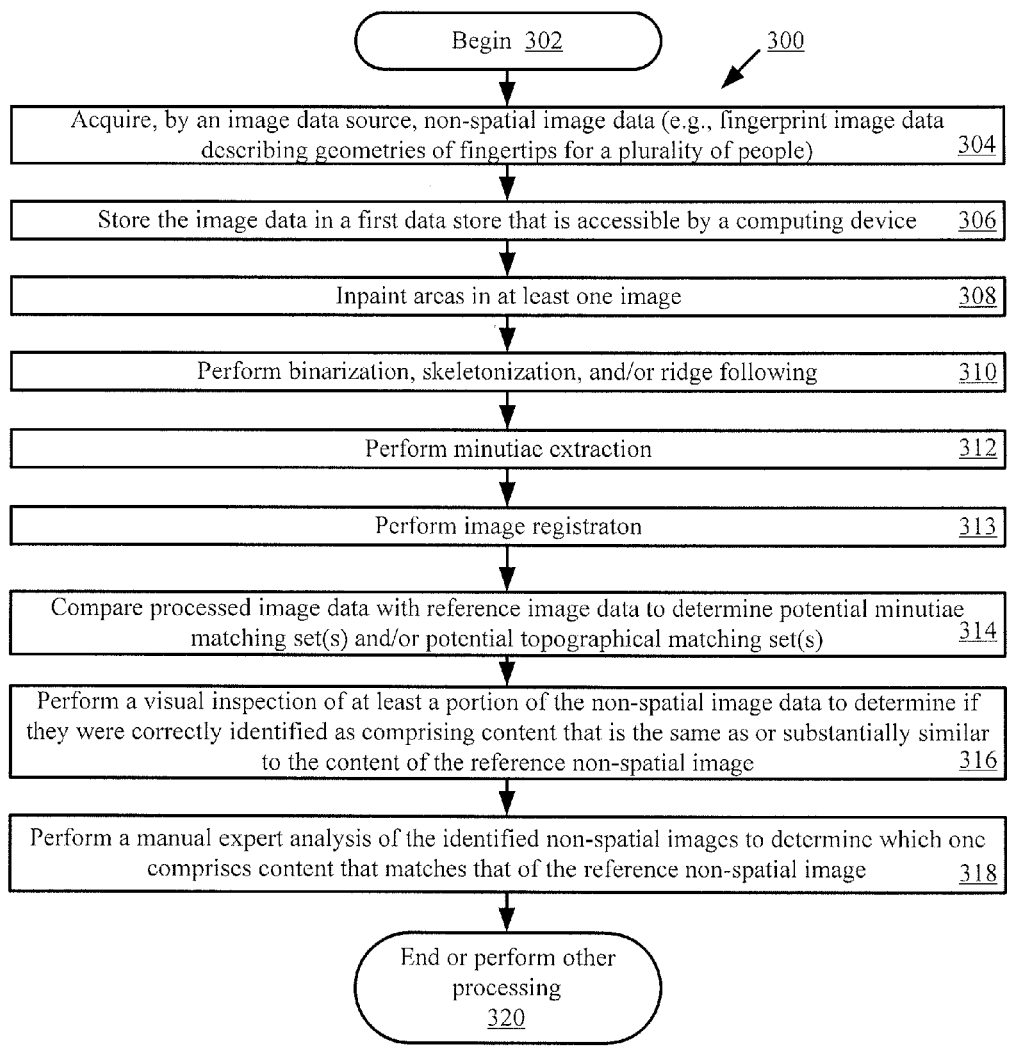
FIG. 3 is a flow diagram of an exemplary method for efficient comparative non-spatial image data analysis.

Referring now to FIG. 3, there is provided a flow diagram of an exemplary method for efficient comparative non-spatial image data analysis. As shown in FIG. 3, the method 300 begins with step 302 and continues with step 304. In step 304, non-spatial image data is collected by an image data source (e.g., image data source 108 of FIG. 1). The non-spatial image data can include, but is not limited to, fingerprint image data describing geometries of fingertips of a plurality of people. The fingerprint image defined by the non-spatial image data can include, but is not limited to, a grayscale fingerprint image.

After the non-spatial image data is collected, it is stored in a data store (e.g., data store 110 of FIG. 1) that is accessible by a computing device (e.g., computing device 102 of FIG. 1), as shown by step 306. In next steps 308-312, a plurality of pre-processing operations are performed using the collected non-spatial image data. The pre-processing operations involve in painting areas of at least one non-spatial image, as shown by step 308. Methods for in painting areas of an image are well known in the art, and therefore will not be described herein. Any such method can be used with the present invention without limitation. Examples of such methods are described in U.S. Pat. No. 7,912,255 to Rahmes et al. and U.S. Patent Publication No. 2011/0044514 to Rahmes et al.

After completing step 308, step 310 is performed where binarization, skeletonization and/or ridge following is performed. Methods for binarization, skeletonization and/or ridge following are well known in the art, and therefore will not be described herein. Any such method can be used with the present invention without limitation. Examples of such methods are described in U.S. Pat. No. 7,912,255 to Rahmes et al., U.S. Patent Publication No. 2011/0262013 to Rahmes et al. and U.S. Patent Publication No. 2011/0262013 to Rahmes et al.

Thereafter, minutiae extraction is performed in step 312. Methods for minutiae extraction are well known in the art, and therefore will not be described herein. Any such method can be used with the present invention without limitation. Examples of such methods are described in U.S. Pat. No. 7,912,255 to Rahmes et al.

Upon completing step 312, the method 300 continues with step 313 where image registration is performed to register each of the non-spatial images defined by the non-spatial image data with a reference non-spatial image. Methods for image registration are well known in the art, and therefore will not be described herein. Any such method can be used with the present invention without limitation. Examples of such methods are described in U.S. Patent Publication No. 2010/0232659 to Rahmes et al. and U.S. Patent Publication No. 2011/0044513 to McGonagle et al.

In a next step 314, the pre-processed non-spatial image data is automatically compared to reference image data. The comparison is performed to identify content of a plurality of non-spatial images that is the same as, substantially similar to or different than the content of a reference non-spatial image. Step 314 can also involve computing a match score and/or other metrics for each of the plurality of non-spatial images. Each match score indicates the amount of matching between the content of one of the plurality of non-spatial images and the content of the reference non-spatial image. The match score can be a minutiae match score and/or a topographical match score. The minutiae match score indicates how many minutiae of the two non-spatial images match each other (i.e., minutiae points that are of the same type and reside at the same or similar locations within the images). In a fingerprint image scenario, the minutiae include, but are not limited to, arches, loops, and whorls. The topographical match score indicates how many minutiae points are common between the two images and/or how many common minutiae points of the two images have the same or substantially similar number of ridges connected thereto. Algorithms for computing match scores and other metrics are well known in the art, and therefore will not be described herein. Any such algorithm can be used in step 314 without limitation.

Subsequently, step 316 is performed where a visual inspection of at least a portion of the non-spatial image data ("candidate image data") is performed by a user of the computing device (e.g., computing device 102 of FIG. 1). The candidate image data defines non-spatial images that were previously identified as comprising content that is the same as or similar to the content of the reference non-spatial image ("candidate images"). Accordingly, the visual inspection is performed to determine if the candidate images were correctly identified as comprising content that is the same as or similar to the content of the reference non-spatial image. If a candidate image was correctly identified, then user-software interactions are performed to indicate to an expert that the candidate image should be manually analyzed thereby. If a candidate image was incorrectly identified, then user-software interactions are performed for removing the candidate image from the set of candidate images such that the candidate image will not be subsequently manually analyzed by the expert. The particularities of step 316 will be described in more detail below in relation to FIGS. 4A-24.

In some embodiments of the present invention, the portion of non-spatial images visually inspected in step 316 include the "N" non-spatial images with the relatively highest match scores associated therewith. "N" is an integer value which is selected in accordance with a particular application. For example, in a fingerprint image analysis application, "N" equals one hundred. Embodiments of the present invention are not limited in this regard.

Referring again to FIG. 3, the method 300 continues with step 318. In step 318, a manual expert analysis is performed using the non-spatial images identified in previous step 316. In a fingerprint scenario, the expert analysis is performed to identify a person from a group of people using fingerprint image data. Accordingly, the expert analysis can involve visually determining and/or verifying which one of the candidate fingerprint images comprises content that matches or "best" matches the content of a reference fingerprint image. Thereafter, step 320 is performed where the method ends or other processing is performed.

Figure 4A:
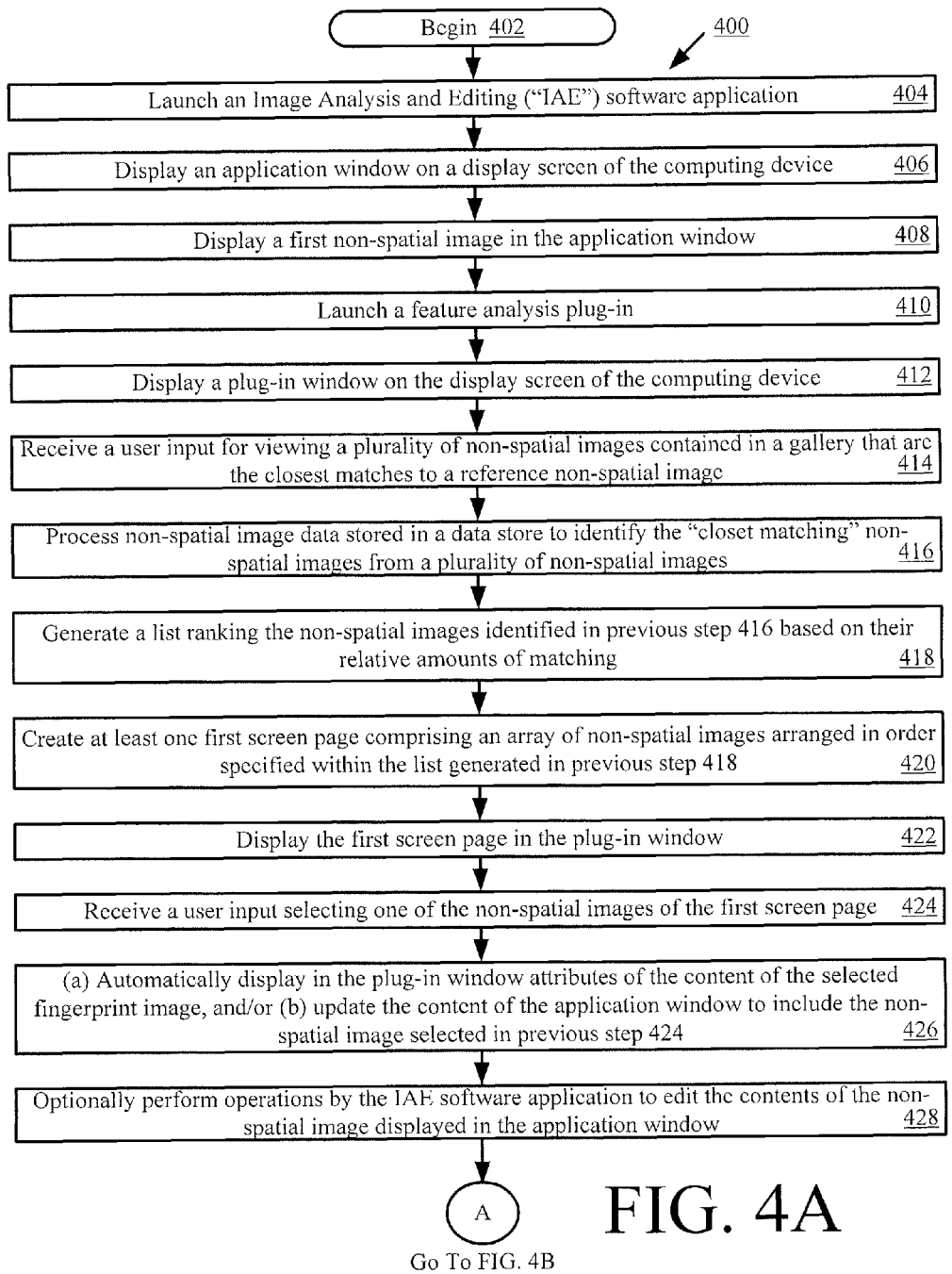
FIGS. 4A-4C collectively provide a flow diagram of an exemplary method for efficient visual inspection of a plurality of fingerprint images.
Figure 4B:
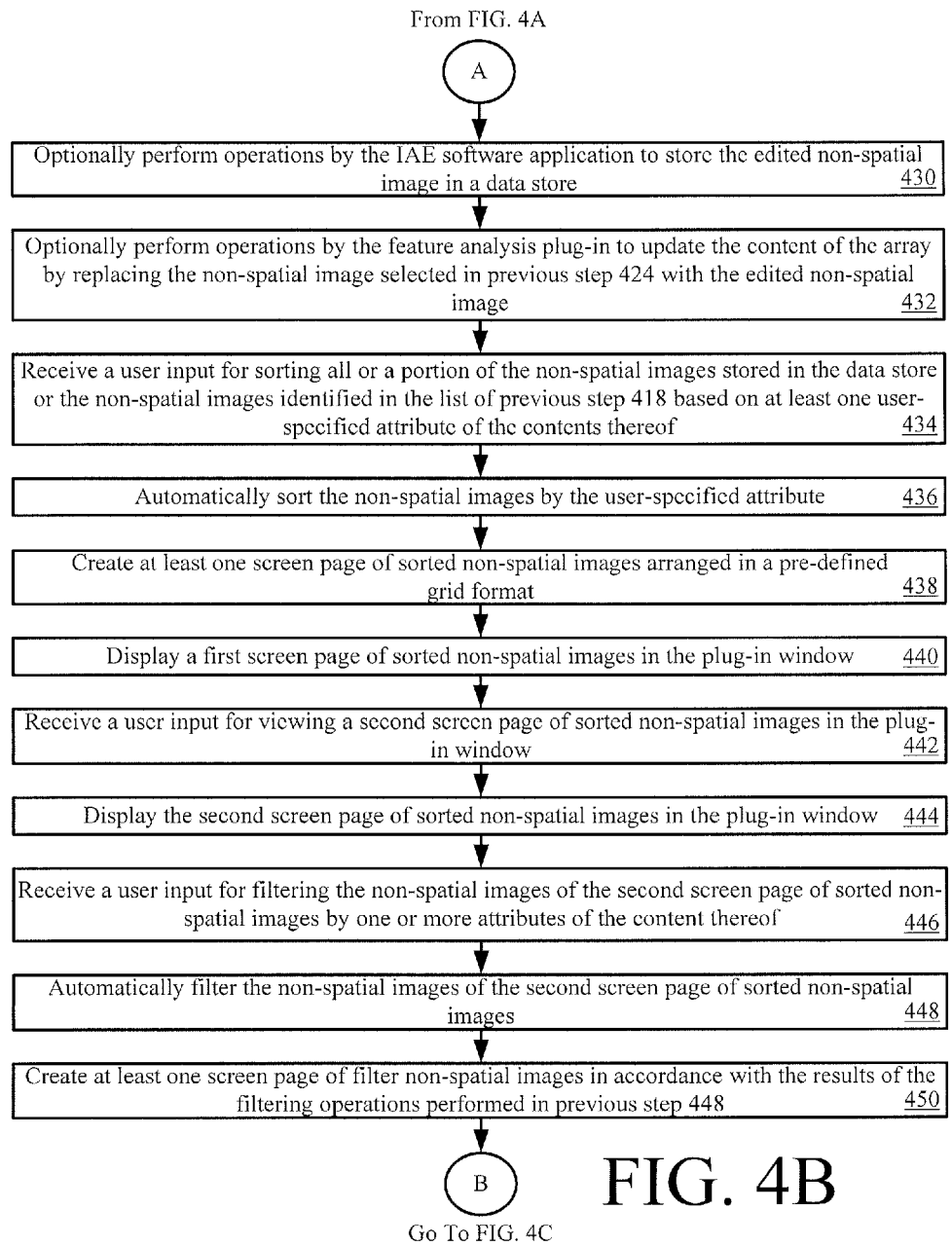
Figure 4C:
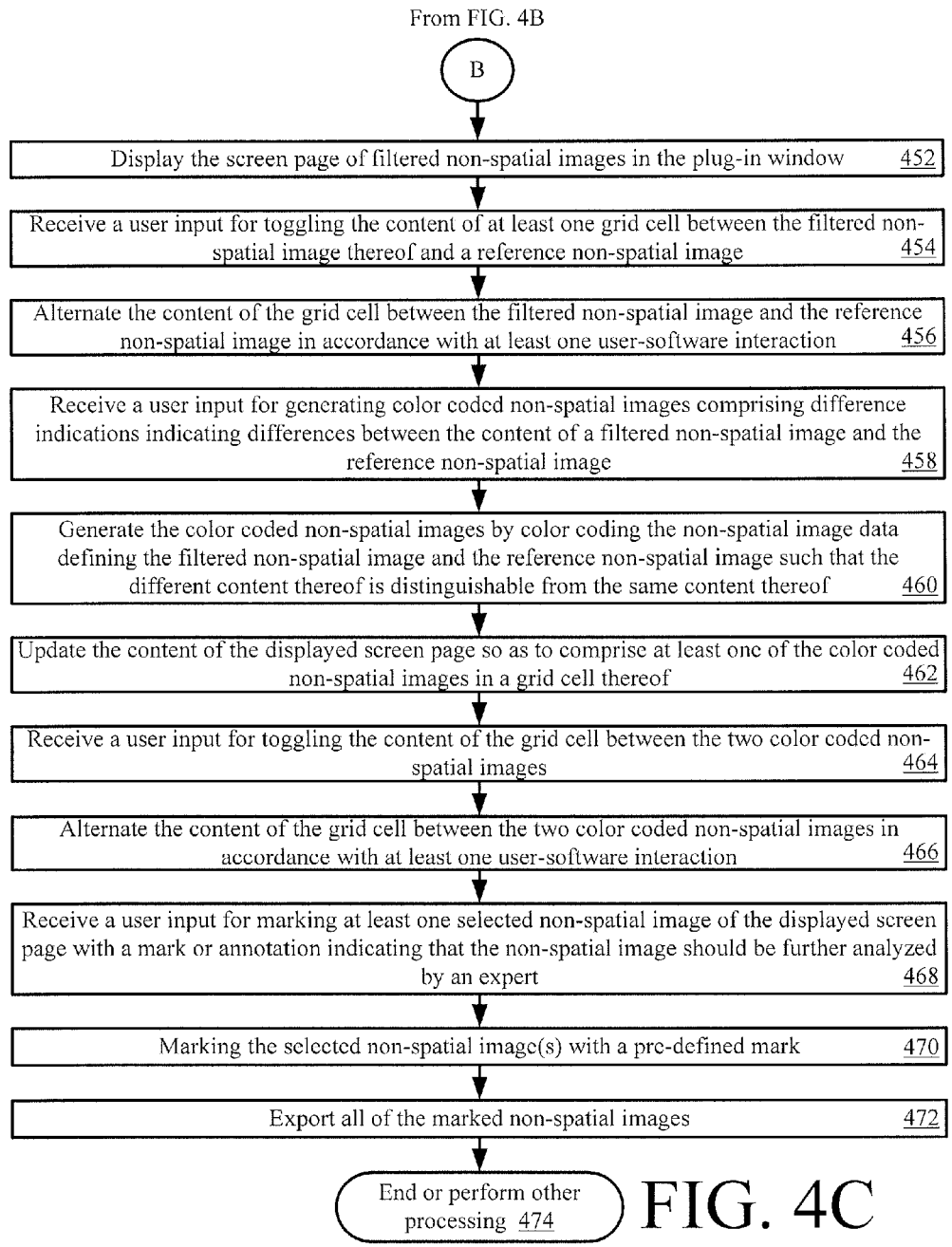
Figure 5:
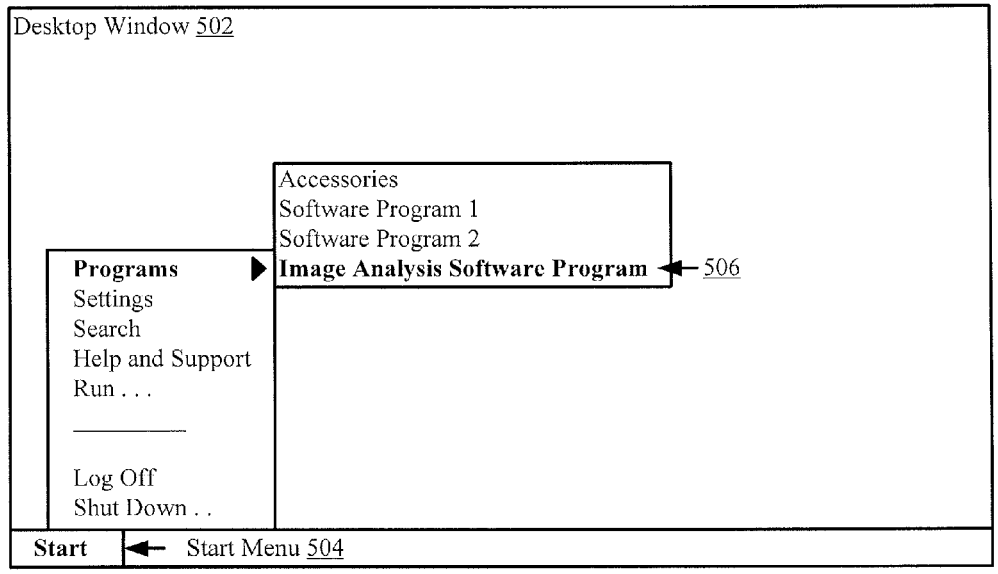
FIG. 5 is a schematic illustration of an exemplary desktop window.

Referring now to FIGS. 4A-4C, a flow diagram of an exemplary method 400 for efficient visual inspection of a plurality of non-spatial images is provided. The method 400 can be performed in step 316 of FIG. 3. As shown in FIG. 4A, method 400 begins with step 402 and continues with step 404. Step 404 involves launching an IAE software application. The IAE software application can be launched in response to a user software interaction. For example, as shown in FIG. 5, an IAE software application can be launched by accessing and selecting an "Image Analysis Software Program" entry 506 on a start menu 504 of a desktop window 502.

Figure 6:
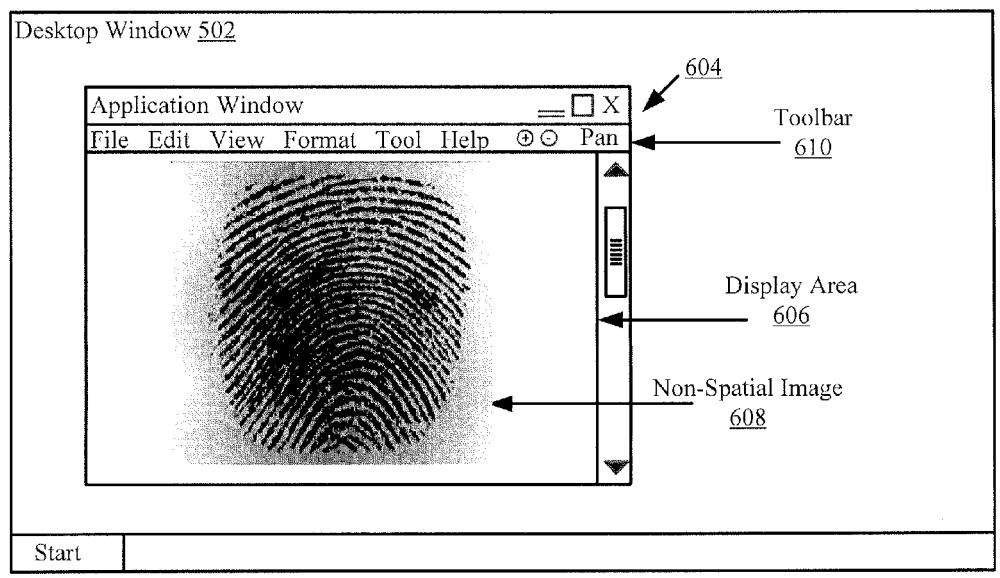
FIG. 6 is a schematic illustration of an exemplary application window.

In a next step 406, an application window is displayed on top of the desktop window. A schematic illustration of an exemplary application window is provided in FIG. 6. As shown in FIG. 6, the application window 604 includes a toolbar 610 including GUI widgets for at least displaying an image, panning an image, zooming an image, editing an image, and launching a plug-in. The application window 604 also includes a display area 606 in which an image (e.g., a fingerprint image) can be presented to a user of the computing device (e.g., computing device 102 of FIG. 1).

Referring again to FIG. 4A, an image is displayed in the application window, as shown in step 408. A schematic illustration showing an exemplary image 608 displayed in an application window 604 is provided in FIG. 6. As shown in FIG. 6, the image 608 can comprise, but is not limited to, a fingerprint image.

Figure 7:
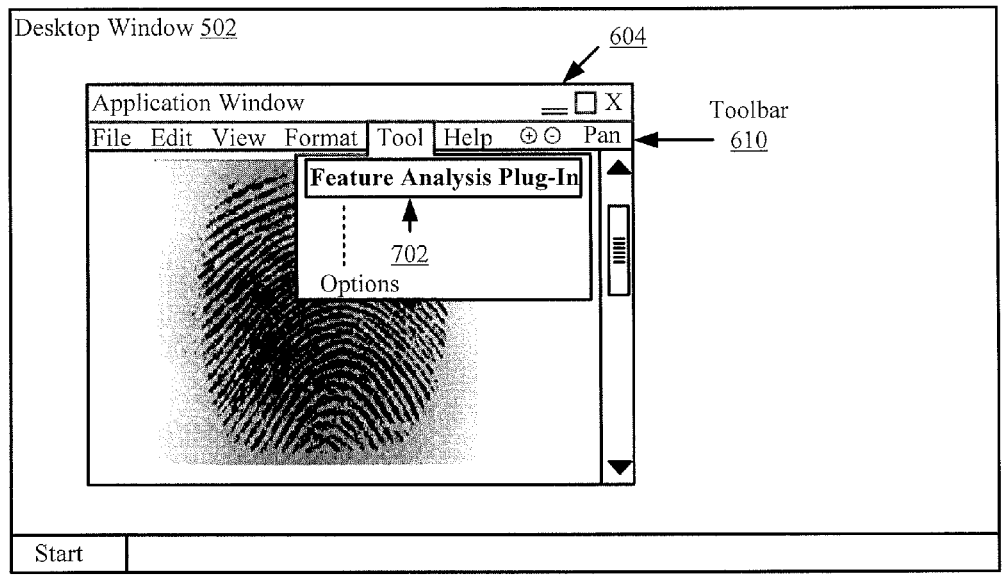
FIG. 7 is a schematic illustration of an exemplary drop down menu of an application window.

After the image is presented to a user of the computing device (e.g., computing device 102 of FIG. 1), a feature analysis plug-in is launched, as shown by step 410. The feature analysis plug-in can be launched in response to a user-software interaction. For example, as shown in FIG. 7, a feature analysis plug-in is launched by selecting an item 702 of a drop down menu of a toolbar 610.

Once the feature analysis plug-in is launched, step 412 is performed where a plug-in window is displayed on top of the desktop window and/or application window. A schematic illustration of an exemplary plug-in window 802 is provided in FIG. 8. As shown in FIG. 8, the plug-in window 802 comprises a toolbar 804, a display area 806, an attribute pane 808, and a scrollbar 810. A schematic illustration of the toolbar 804 is provided in FIG. 9A. As shown in FIG. 9A, the toolbar 804 comprises a plurality of exemplary GUI widgets 902-928. Each of the GUI widgets 902-928 is described above in detail.

Referring again to FIG. 4A, a next step 414 involves receiving a user input for viewing non-spatial images contained in a gallery that are the closest matches to a reference non-spatial image. The user input can be facilitated by a GUI widget of the toolbar of the plug-in window. For example, the GUI widget employed in step 414 can include, but is not limited to, GUI widget 902 and/or GUI 910 of FIG. 9A.

In response to the user input of step 414, step 416 is performed where non-spatial image data is processed to identify the "closest matching" non-spatial images from a plurality of non-spatial images. The identification can involve identifying non-spatial images with match scores equal to and/or greater than a pre-defined threshold value (e.g., 7.5). Thereafter, a list is generated in which the non-spatial images identified in previous step 416 are ranked based on their relative amounts of matching, as shown by step 418. A schematic illustration of an exemplary list 1000 is provided in FIG. 10. As shown in FIG. 10, non-spatial images (e.g., fingerprint images) 1011, 1050, 1231, 1539, 0001, 0102, 0900, 1678, 0500, 0020, 0992, 1033, 1775, 1829 are ranked (or listed in a descending ranked order) based on their match scores. Embodiments of the present invention are not limited to the particularities of FIG. 10.

Referring again to FIG. 4A, the method 400 continues with step 420 where a feature analysis plug-in generates at least one screen page comprising an array of non-spatial images. The non-spatial images are presented in the ranked order specified within the list generated in previous step 418. A schematic illustration of a plurality of screen pages of non-spatial images 1102, 1104, 1106 is provided in FIG. 11. As shown in FIG. 11, each screen page 1102, 1104, 1106 comprises a grid 1206 defined by a plurality of grid cells 1208. Each grid cell 1208 of screen pages 1102 and 1104 has a respective non-spatial image 1011, 1050, 1231, 1539, 0001, 0102, 0900, 1678, 0500, 0020, 0992, 1033 presented therein. Only two grid cells 1208 of screen page 1106 have non-spatial images 1775, 1829 presented therein. Embodiments of the present invention are not limited in this regard. A screen page can have any number of non-spatial images presented therein in accordance with a particular application. For example, if there are more than fourteen non-spatial images identified in the "rank" list, then the screen page 1106 would comprise more than two non-spatial images. In contrast, if less than twelve non-spatial images are identified in the "ranked" list, then screen page 1106 would be created by the feature analysis plug-in.

Referring again to FIG. 4A, one of the previously generated screen pages (e.g., screen pages 1102-1106 of FIG. 11) is displayed in the plug-in window (e.g., plug-in window 802 of FIG. 8), as shown by step 422. A schematic illustration of an exemplary screen page 1102 displayed in a plug-in window 802 is provided in FIG. 12.

Figure 13:
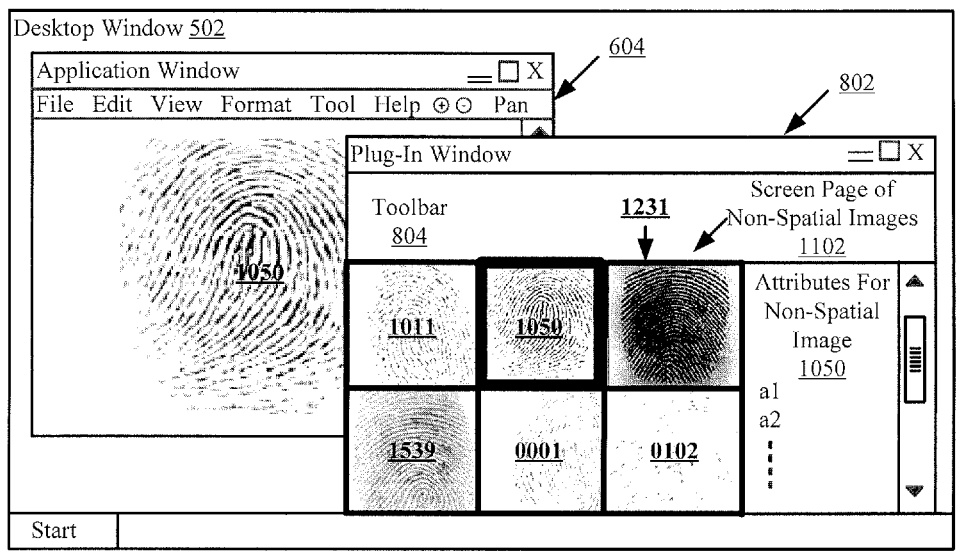
FIG. 13 is a schematic illustration of an exemplary selected fingerprint image and exemplary displayed attributes thereof.
Figure 14:
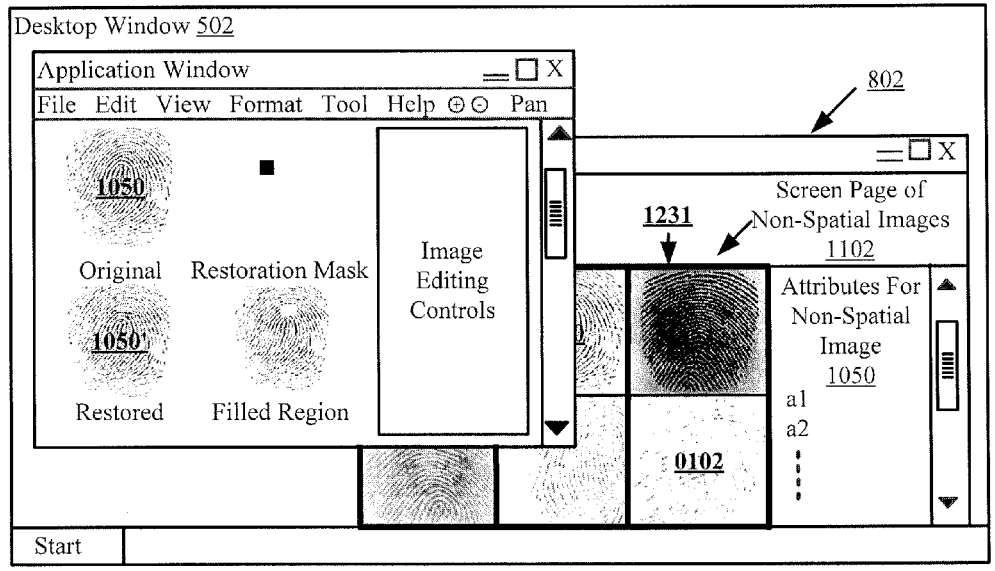
FIG. 14 is a schematic illustration of an exemplary application window for facilitating the editing of a fingerprint image.

In a next step 424, the computing device (e.g., computing device 102 of FIG. 1) receives a user input selecting one of the non-spatial images of the displayed screen page. The non-spatial image can be selected by moving a mouse cursor over the non-spatial image and clicking a mouse button. A schematic illustration of a selected non-spatial image 1050 is provided in FIG. 13. As shown in FIG. 13, the selected non-spatial image 1050 is annotated with a relatively thick and distinctly colored border. Embodiments of the present invention are not limited in this regard. Any type of mark or annotation can be used to illustrate that a particular non-spatial image has been selected.

In response to the user input of step 424, the feature analysis plug-in performs operations in step 426 for automatically displaying in the plug-in window attributes of the content of the selected non-spatial image. The attribute information can be displayed in an attribute pane (e.g., attribute pane 808 of FIG. 8) of the plug-in window (e.g., plug-in window 802 of FIG. 8). A schematic illustration of an exemplary plug-in window 82 is provided in FIG. 13 which has attribute information a1, a2 displayed therein. The attribute information can include, but is not limited to, calculated attributes and tagged attributes of the content (e.g., a fingerprint) of a non-spatial image. Calculated attributes and tagged attributes are described above.

Additionally or alternatively, the feature analysis plug-in can perform operations in step 426 for updating the content of the application window to include the non-spatial image selected in previous step 424. A schematic illustration of an exemplary updated application window is provided in FIG. 13. As shown in FIG. 13, the application window 604 has displayed therein the non-spatial image 1050 which is the same as the selected non-spatial image 1050 of the plug-in window.

In a next step 428, operations are performed by the IAE software application for editing the contents of at least one non-spatial image. The editing can involve filling in missing data of the non-spatial image. A schematic illustration of an original non-spatial image 1050 and an edited version of the non-spatial image 1050' is provided in FIG. 14. Methods for editing non-spatial images are well known in the art, and therefore will not be described herein. Any such method can be used with the present invention without limitation.

Figure 15:
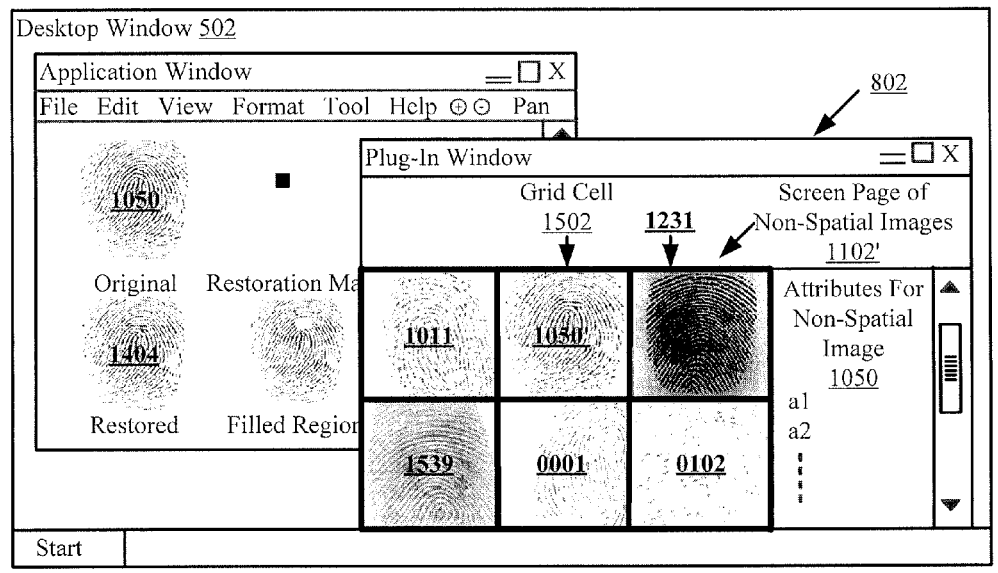
FIG. 15 is a schematic illustration of an exemplary screen page with content that has been updated to include an edited fingerprint image.

Upon completing step 428, the method 400 continues with optional step 430 of FIG. 4B. Optional step 430 involves storing the edited non-spatial image (e.g., non-spatial image 1050' of FIG. 14) in a data store (e.g., data store 110 of FIG. 1). In a next optional step 432, the feature analysis plug-in performs operations to update the content of the array of the displayed screen page (e.g., screen page 1102 of FIG. 14). The content is updated by replacing the non-spatial image (e.g., fingerprint image 1050 of FIG. 14) with the edited non-spatial image (e.g., fingerprint image 1050' of FIG. 14). A schematic illustration of an updated screen page 1102' is provided in FIG. 15. As shown in FIG. 15, the content of grid cell 1502 has been updated such that it comprises an edited non-spatial image 1050' rather than the original non-spatial image 1050.

Referring again to FIG. 4B, the method 400 continues with step 434 where a user input is received by the computing device for sorting all or a portion of the non-spatial images stored in the data store (e.g., data store 110 of FIG. 1) or the non-spatial images identified in the list generated in previous step 418 based on at least one user-specified attribute of the contents thereof. The user input is facilitated by a GUI widget (e.g., GUI widget 914 of FIG. 9A) of the plug-in window (e.g., the plug-in window 802 of FIG. 8). The GUI widget may be configured to allow a user to specify the attribute(s) that the sorting should be based on, and/or specify whether the non-spatial images should be sorted in an ascending order or a descending order.

In response to the user input of step 434, all or a portion of the non-spatial images are sorted in an ascending order or a descending order based on the user-specified attribute(s), as shown by step 436. Thereafter in step 438, at least one screen page of sorted non-spatial images is created by the feature analysis plug-in. The sorted non-spatial images are arranged on the screen page in a pre-defined grid format or a matrix format. A first screen page of sorted non-spatial images is then displayed in the plug-in window, as shown by step 440.

The first screen page of sorted non-spatial images may or may not include the same non-spatial images as the previously displayed screen page of non-spatial images (e.g., screen page 1102' of FIG. 15). For example, if a grid (e.g., grid 1206 of FIG. 11) of a previously displayed screen page (e.g., screen page 1102' of FIG. 15) has a grid size of three cells by two cells, then six non-spatial images (e.g., non-spatial images 1011, 1050', 1231, 1539, 0001, 0102 of FIG. 15) of fourteen non-spatial images (e.g., non-spatial images 1011, 1050', 1231, 1539, 0001, 0102, 0900, 1678, 0500, 0020, 0992, 1033, 1775, 1829 of FIGS. 11 and 15) are presented therein. Thereafter, an ordered list is generated by sorting the fourteen non-spatial images by at least one user-specified attribute (e.g., the number of minutiae) of the content thereof. In this scenario, the grid (e.g., grid 1206 of FIG. 11) is updated to include the first six non-spatial images identified in the ordered list. These first six non-spatial images of the ordered list may include one or more of the original non-spatial images of the grid (e.g., non-spatial images 1011, 1050', 1231, 1539, 0001, 0102), as well as one or more non-spatial images (e.g., non-spatial images 0992, 0900, 0500, 1678, 1775, 1829, 0020, 1033) different than the original non-spatial images of the grid.

Figure 16:
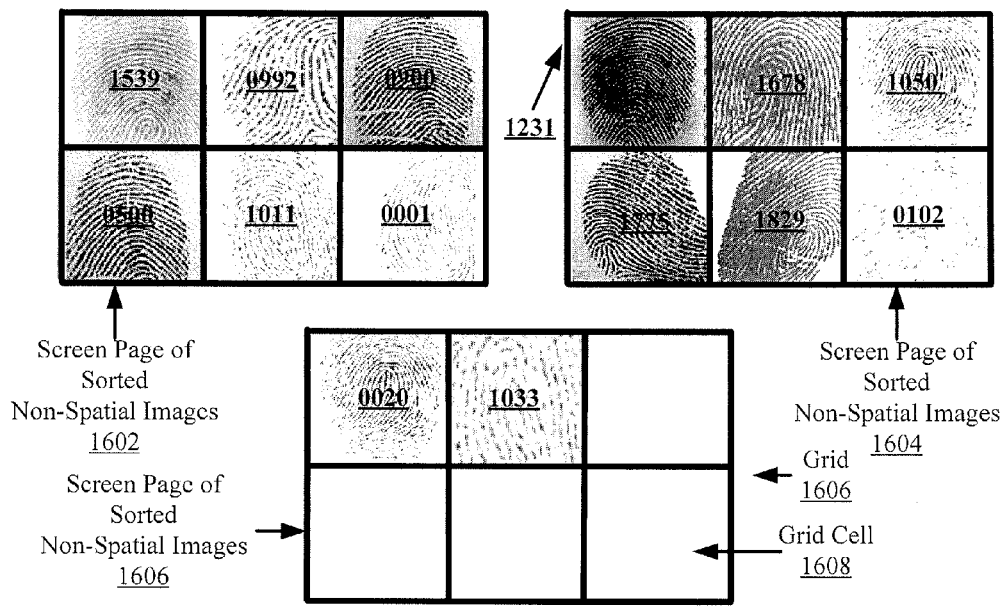
FIG. 16 is a schematic illustration of exemplary screen pages of sorted fingerprint images.
Figure 17:
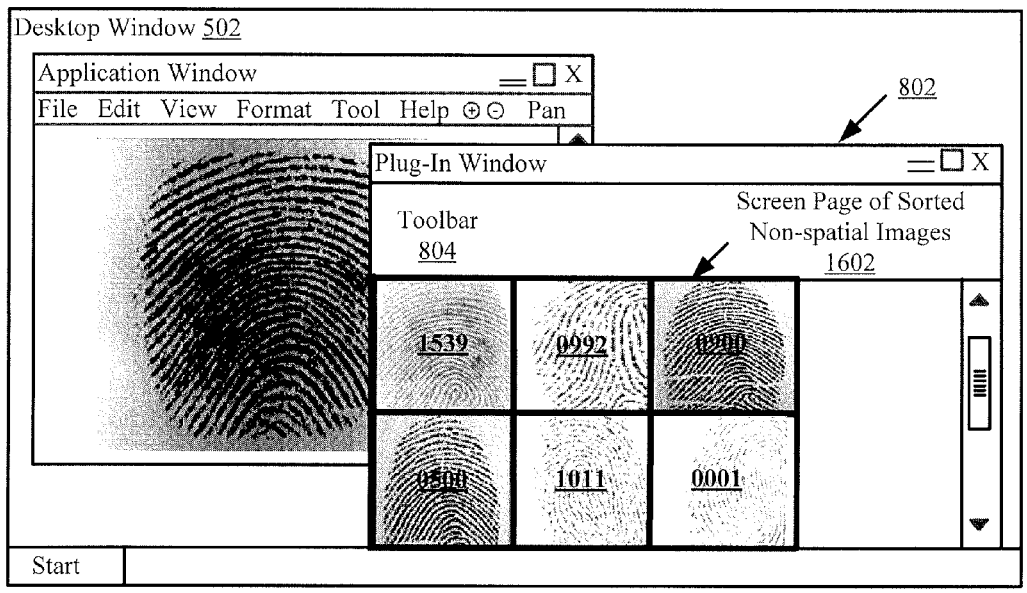
FIGS. 17-18 each provide a schematic illustration of an exemplary displayed screen page of sorted fingerprint images.
Figure 18:
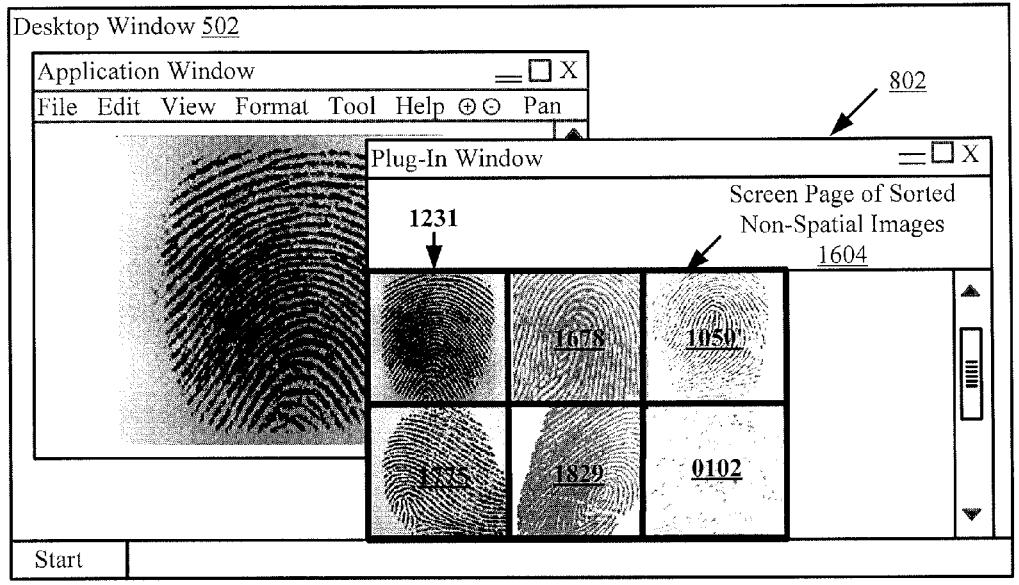

A schematic illustration of exemplary screen pages of sorted non-spatial images 1602, 1604, 1606 is provided in FIG. 16. As shown in FIG. 16, each screen page of sorted non-spatial images 1602, 1604 includes three of the same non-spatial images as those contained in the previously presented screen page of non-spatial images 1102'. In contrast, screen page of sorted non-spatial images 1606 includes none of the images of the previously presented screen page of non-spatial images 1102'. Embodiments of the present invention are not limited in this regard. For example, each of the screen pages 1602, 1604, 1606 can include zero or more of the non-spatial images contained in the previously presented screen page of non-spatial images 1102'. A schematic illustration of the screen page 1606 of FIG. 16 displayed in the plug-in window 802 is provided in FIG. 17.

Referring again to FIG. 4B, the method 400 continues with step 442 where the computing device (e.g., computing device 102 of FIG. 1) receives a user input for viewing a second screen page of sorted non-spatial images in the plug-in window. The user input is facilitated by a GUI widget (e.g., GUI widget 904 or 906 of FIG. 9A) of the plug-in window (e.g., the plug-in window 802 of FIG. 8). The GUI widget may be configured to facilitate moving through screen pages of unsorted and/or sorted non-spatial images. In this regard, the GUI widget includes arrow buttons that allow a user to move forward and backward through the screen pages of unsorted and/or sorted non-spatial images. Alternatively or additionally, the GUI widget may be configured to facilitate jumping to a desired screen page of unsorted and/or sorted non-spatial images for review. In this regard, the GUI widget includes a text box for entering a screen page number and a search button for causing the screen page of unsorted and/or sorted non-spatial images having the entered screen page number to be displayed in the display area (e.g., display area 806 of FIG. 8) of the plug-in window (e.g., plug-in window 802 of FIG. 8).

After the user input is received in step 442, the method 400 continues with step 444 where the second screen page of sorted non-spatial images is displayed in the plug-in window. A schematic illustration of an exemplary second screen page of sorted non-spatial images 1604 displayed in the plug-in window 802 is provided in FIG. 18.

In a next step 446, the computing device (e.g., computing device 102 of FIG. 1) receives a user input for filtering the non-spatial images of the second screen page of sorted non-spatial images by one or more attributes of the content thereof. The user input is facilitated by a GUI widget (e.g., GUI widget 912 of FIG. 9A) of the plug-in window (e.g., the plug-in window 802 of FIG. 8). In this regard, the GUI widget includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["MATCH SCORE"≥'7.5'] and/or ["PRINT TYPE"='ARCH']. A schematic illustration of an exemplary drop-down box 950 is provided in FIG. 9B.

Upon receipt of the user input in step 446, the feature analysis plug-in performs operations to filter the non-spatial images of the displayed second page of sorted non-spatial images, as shown by step 448. In a next step 450, a screen page of filtered non-spatial images is created by the feature analysis plug-in. The screen page of filtered non-spatial images is created by removing at least one non-spatial image from the displayed second screen page of sorted non-spatial images in accordance with the results of the filtering operations performed in previous step 448. Thereafter, in step 452 of FIG. 4C, the screen page of filtered non-spatial images is displayed in the display area (e.g., display area 806 of FIG. 8) of the plug-in window (e.g., plug-in window 802 of FIG. 8).

Figure 19:
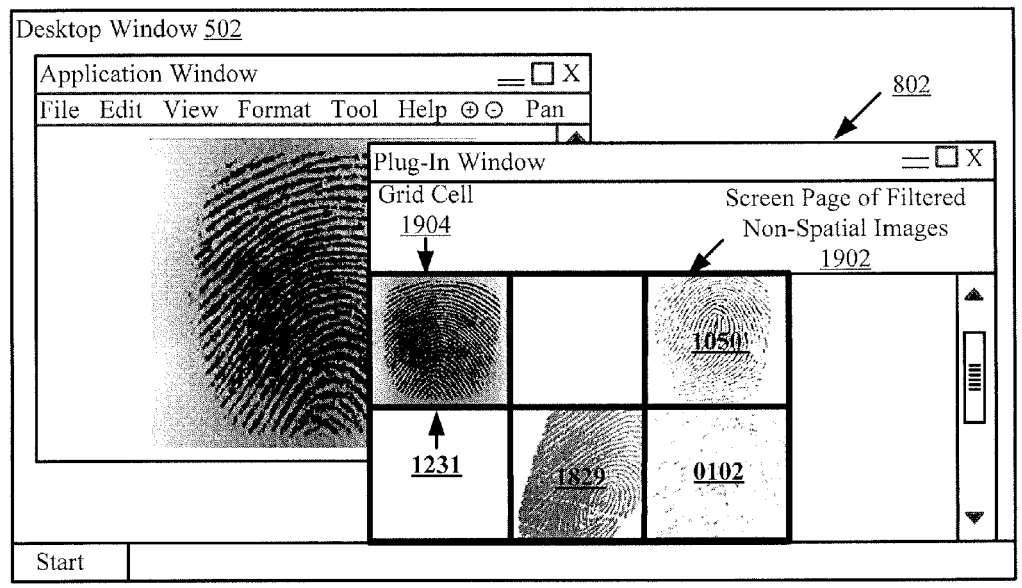
FIG. 19 is a schematic illustration of an exemplary screen page of filtered fingerprint images.

A schematic illustration of an exemplary displayed screen page of filtered non-spatial images 1902 is provided in FIG. 19. As shown in FIG. 19, the screen page of filtered non-spatial images 1902 includes the non-spatial images 1231, 1050', 1829, 0102 contained in the second screen page of sorted non-spatial images 1604 of FIG. 16. However, the screen page of filtered non-spatial images 1902 does not include non-spatial images 1678 and 1775 in grid cells thereof. In this regard, it should be understood that non-spatial images 1678 and 1775 have been removed from the second screen page of sorted non-spatial images 1604 of FIG. 18 to obtain the screen page of filtered non-spatial images 1902. Embodiments of the present invention are not limited in this regard.

Referring again to FIG. 4C, the method 400 continues with step 454 where the computing device (e.g., computing device 102 of FIG. 1) receives a user input for toggling the content of at least one grid cell between the filtered non-spatial image thereof and a reference non-spatial image. The user input can be facilitated by a GUI widget (e.g., GUI widget 924 of FIG. 9A) of a plug-in window and/or by an item presented in an "image context" GUI. In the GUI widget scenario, the GUI widget is provided to facilitate the toggling of the content of at least one cell of an array of a displayed screen page between two non-spatial images (e.g., a candidate fingerprint image and a reference fingerprint image). A user may want to toggle between non-spatial images for similarity or difference detection purposes. The GUI widget is configured to allow manual toggling and/or automatic toggling between non-spatial images. As such, the GUI widget 924 includes, but is not limited to, a check box for enabling and disabling image toggling operations of the feature analysis plug-in, a slider for setting the rate at which the content of array cells automatically changes, and/or a button for manually commanding when to change the content of array cells. In the "image context" GUI scenario, the content of a single array cell is toggled between two non-spatial images by right clicking on the array cell to obtain access to the "image context" GUI (not shown in the figures) and selecting a "toggle" item (not shown in the figures) from the "image context" GUI.

Figure 20:
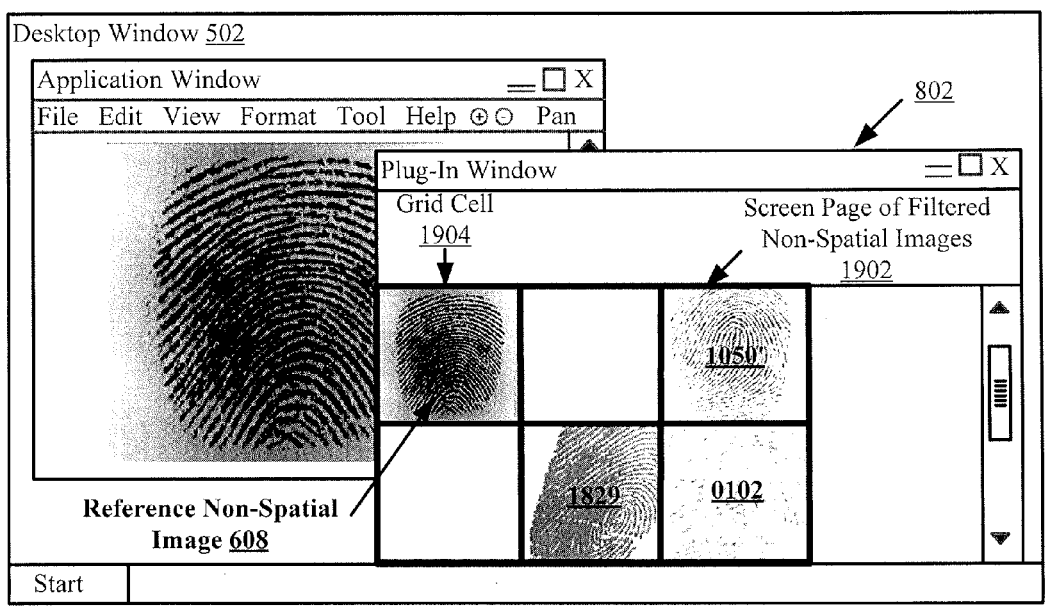
FIG. 20 is a schematic illustration of exemplary screen page in which the content of a grid cell is toggled between a candidate fingerprint image and a reference fingerprint image.

In response to the user input of step 454, the feature analysis plug-in performs operations for alternating the content of the grid cell between the filtered non-spatial image and the reference non-spatial image in accordance with at least one user-software interaction, as shown by step 456. The results of the toggling operations are schematically illustration in FIGS. 19-20. As shown in FIG. 19, grid cell 1904 has the filtered non-spatial image 1231 presented therein. As shown in FIG. 20, grid cell 1904 has the reference non-spatial image 608 displayed therein.

In a next step 458, the computing device (e.g., computing device 102 of FIG. 1) receives a user input for generating color coded non-spatial images comprising difference indications indicating differences between the content of a filtered non-spatial image and the reference non-spatial image. The user input can be facilitated by a GUI widget (e.g., GUI widget 922 of FIG. 9A) of the plug-in window or an "image context" GUI. In the GUI widget scenario, the GUI widget is provided to facilitate the generation and display of color coded non-spatial images. A user may want to view color coded non-spatial images for purposes of quickly seeing similarities and/or differences between the content of two or more non-spatial images. For example, a user may want to view a color coded candidate fingerprint image and a color coded reference fingerprint image for purposes of speeding up an fingerprint comparison task. In this scenario, the data of the candidate non-spatial can be color coded such that red portions thereof indicate content that is the same as or different than the content of the reference non-spatial image. Similarly, the data of the reference non-spatial image can be color coded such that green portions thereof indicate content that is the same as or different than the content of the candidate non-spatial image. Accordingly, GUI widget includes, but is not limited to, a check box for enabling and disabling color coding operations of the feature analysis plug-in and a drop down menu for selecting one or more array cells whose content should be changed to include a color coded non-spatial image. In the "image context" GUI scenario, a non-spatial image can also be color coded by right clicking on the image to obtain access to an "image context" GUI (not shown in the figures) and selecting a "color code" item (not shown in the figures) from the "image context" GUI.

In response to the user input of step 458, the feature analysis plug-in performs operations for generating the color coded non-spatial images, as shown by step 460. The color coded non-spatial images are generated by: comparing the content of the filtered non-spatial image and the reference non-spatial image to determine the content thereof that is the same and different; and color coding the non-spatial image data defining the filtered non-spatial image and the reference non-spatial image such that the different content thereof is distinguishable from the same content thereof. Methods for color coding images are well known in the art, and therefore will not be described herein. Any such method can be used with the present invention without limitation.

Figure 21:
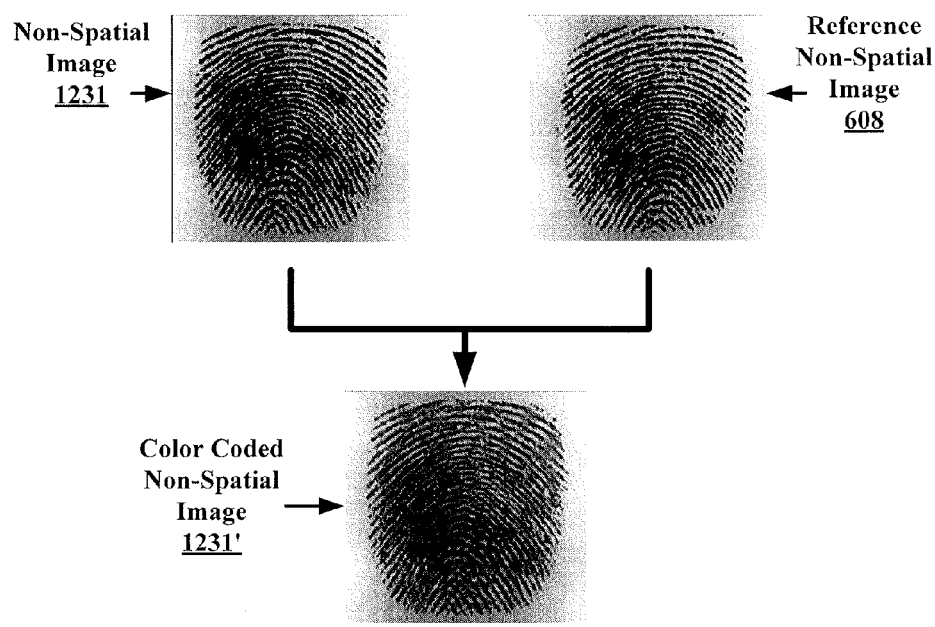
FIG. 21 is a schematic illustration of an image color coding process.

The operations performed in step 460 are schematically illustration in FIG. 21. As shown in FIG. 21, two non-spatial images 1231 and 608 are compared to each other to identify the content thereof that is the same and different. Thereafter, a color coded non-spatial image 2131' is generated. The content of the color coded non-spatial image 2131' which is the same as the content of non-spatial image 608 is presented in a relatively light color (e.g., green). In contrast, the content of the color coded non-spatial image 2131' which is different than the content of non-spatial image 608 is presented in a relatively dark color (e.g., purple). Embodiments are not limited to the particularities of FIG. 21.

Figure 22:
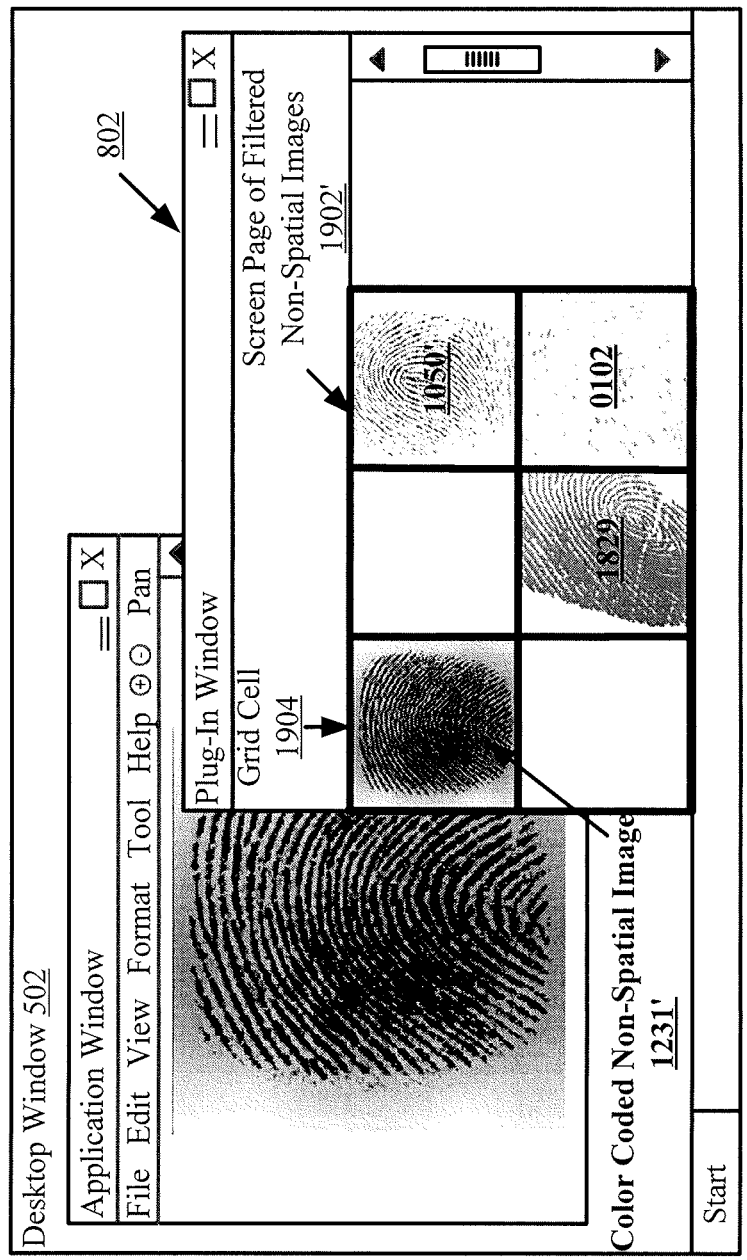
FIG. 22 is a schematic illustration of an exemplary displayed screen page comprising a color coded non-spatial image.

Referring again to FIG. 4C, the method 400 continues with step 462 where the feature analysis plug-in perform operations for updating the content of the displayed screen page (e.g., screen page 1902 of FIG. 20) so as to comprise at least one of the color coded non-spatial images in a respective grid cell (e.g., grid cell 1904 of FIG. 20) thereof. A schematic illustration of an updated screen page 1902' is provided in FIG. 22. As shown in FIG. 22, the content of grid cell 1904 has been updated so as to comprise the color coded image 1231'.

In a next step 464, the computing device receives a user input for toggling the content of the grid cell (e.g., grid cell 1904 of FIG. 22) between the two color coded non-spatial images generated in the previous step 462. The user input can be facilitated by The user input can be facilitated by a GUI widget (e.g., GUI widget 924 of FIG. 9A) of a plug-in window and/or by an item presented in an "image context" GUI, as described above in relation to previous step 454. In response to the user input of step 464, step 466 is performed where the content of the grid cell is alternated between the two color coded non-spatial images in accordance with at least one user-software interaction.

In a next step 468, the computing device (e.g., computing device 102 of FIG. 1) receives a user input for marking at least one non-spatial image of the displayed non-spatial images (e.g., non-spatial images 1231', 1050', 1829, 0102 of FIG.

22). A user may desire to mark a non-spatial image for purposes of indicating that the non-spatial image should be further analyzed by an expert. Step 468 can involve selecting a non-spatial image. The non-spatial image can be selected by moving a mouse cursor over the non-spatial image and clicking a mouse button. In response to the click of the mouse button, a menu is presented to the user of the computing device. The menu includes a list of commands, such as a command for enabling "mark/unmark" operations of the feature analysis plug-in.

Figure 23:
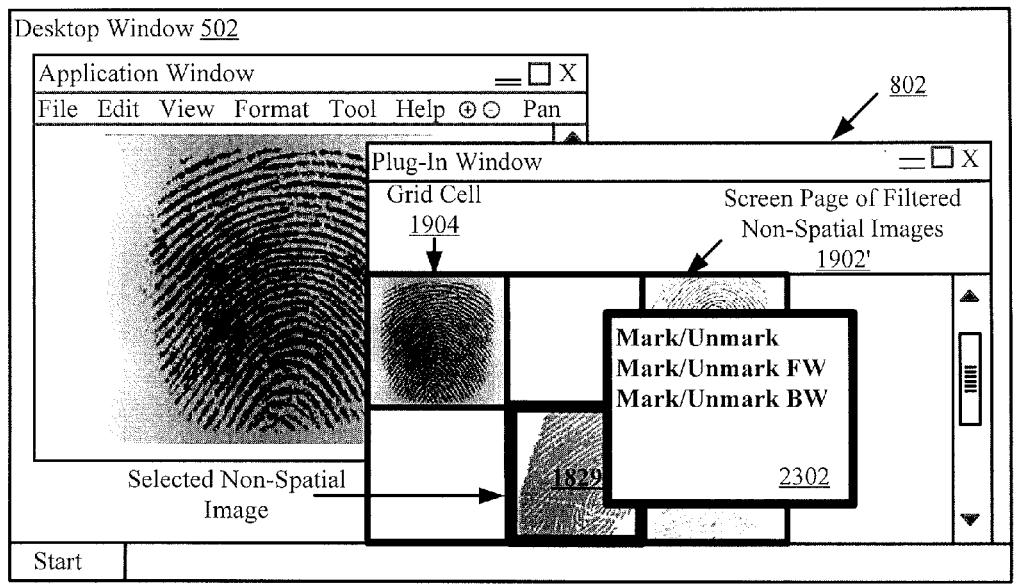
FIG. 23 is a schematic illustration of an exemplary selected non-spatial image and exemplary menu of commands.
Figure 24:
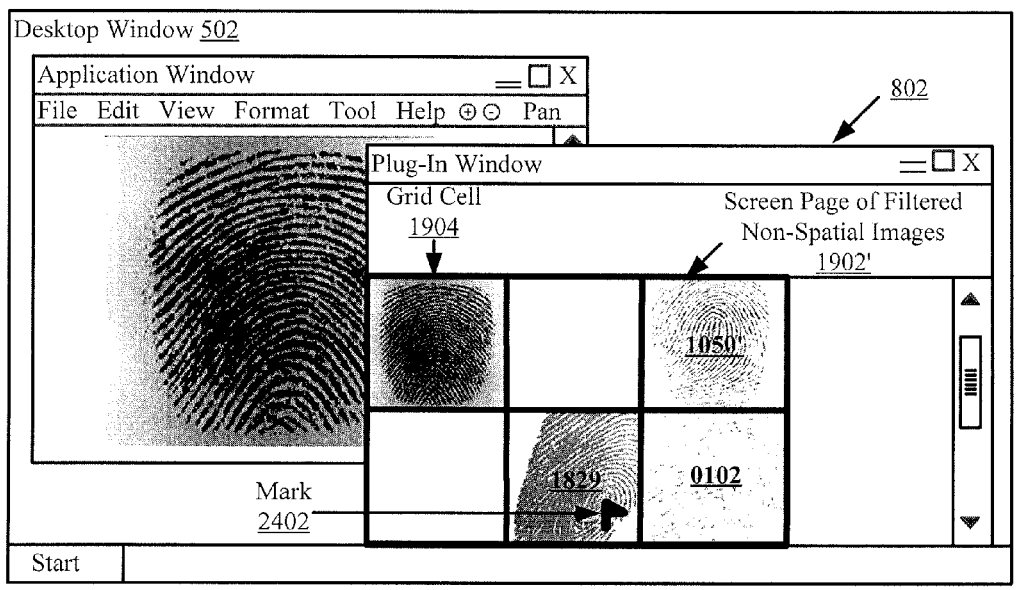
FIG. 24 is a schematic illustration of an exemplary marked or annotated non-spatial image.

A schematic illustration of exemplary selected non-spatial images 1829 and an exemplary menu 2302 is provided in FIG. 23. As shown in FIG. 23, the selected non-spatial image 1829 is annotated with a relatively thick and distinctly colored border. Also, a selected command "Mark/Unmark" of the menu 2302 is annotated by bolding the text thereof. Embodiments of the present invention are not limited in this regard. Any type of mark or annotation can be used to illustrate that a particular non-spatial image has been selected and/or that a particular command of a menu has been selected.

In response to the reception of the user input in step 468 of FIG. 4C, the feature analysis plug-in performs step 470. In step 470, the selected non-spatial image is automatically marked with a pre-defined mark. A schematic illustration of a non-spatial image 1829 marked with a mark 2402 is provided in FIG. 24. Embodiments of the present invention are not limited to the particularities of FIG. 24. Any type of mark or annotation can be employed to illustrate that a non-spatial image has been marked or annotated. Also, other non-spatial images may be marked in step 468. In this scenario, the "Mark/Unmark FW" or the "Mark/Unmark BW" command of the menu 2302 can be selected. By selecting the "Mark/Unmark FW" command, the selected non-spatial image and the non-spatial images which precede the selected non-spatial image in an order will be marked or annotated. By selecting the "Mark/Unmark BW" command, the selected non-spatial image and the non-spatial images which succeeding the selected non-spatial image in an order will be marked or annotated.

After the non-spatial image(s) is(are) marked or annotated, step 472 is performed where the feature analysis plug-in performs operations for exporting all of the marked or annotated non-spatial images to a table or a file. The exportation can be initiated by a user of the computing device using a GUI widget (e.g., GUI widget 916 or 918 of FIG. 9A) of the plug-in window. Thereafter, step 474 is performed where the method 400 ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for efficient comparative non-spatial image data analysis, comprising:
identifying non-spatial images from a plurality of non-spatial images with first match scores equal to or greater than a pre-defined threshold value, where each first match score indicates an amount of matching between content of a respective non-spatial image of the non-spatial images and content of a reference non-spatial image;
ranking, by at least one electronic circuit, the non-spatial images which were identified from the plurality of non-spatial images, where the ranking is based on at least one first attribute of the non-spatial images, and said first attribute comprises a second match score that indicates at least one of (a) how many minutiae points match each other or are common between at least two finger print images and (b) how many common minutiae points of the at least two finger print images have the same number of ridges connected thereto;
generating, by said electronic circuit, a screen page comprising an array defined by a plurality of cells in which at least two images of said plurality of non-spatial images are simultaneously presented in an order defined by said ranking thereof;
displaying, by said electronic circuit, said screen page in a first GUI window of a display screen;
wherein each of said plurality of cells comprises only one of said non-spatial images.

2. The method according to claim 1, wherein said plurality of non-spatial images are further ranked based on a second attribute that comprises a computed metric that specifies an amount of content of the respective non-spatial image of said plurality of non-spatial images that matches content of the reference non-spatial image.

3. The method according to claim 1, further comprising displaying in said first GUI window at least said first attribute associated with a selected one of said plurality of non-spatial images that is presented therein.

4. The method according to claim 1, further comprising changing content of a second GUI window to include a non-spatial image of a selected one of said plurality of non-spatial images that is presented in said first GUI window.

5. The method according to claim 1, further comprising replacing a selected image of said plurality of non-spatial images that is presented in said first GUI window with an edited version of said selected image.

6. The method according to claim 1, further comprising sorting or filtering said plurality of non-spatial images based on at least one second attribute thereof.

7. The method according to claim 6, wherein said second attribute comprises a print type, a number of minutiae, minutiae characteristics, a number of ridges, a number of broken ridges, a presence of a core in a fingerprint, an area of a fingerprint, a contrast of an image, a brightness of an image, an intensity of an image, a number of pores that are in a fingerprint, or a number of pores of a fingerprint that were filled.

8. The method according to claim 1, further comprising toggling content of one particular cell of the plurality of cells contained in the displayed screen page between two different non-spatial images, wherein said two different non-spatial images comprise a candidate fingerprint image and a reference fingerprint image.

9. The method according to claim 1, further comprising toggling content of one particular cell of the plurality of cells contained in the displayed screen page between two different non-spatial images, wherein said two different non-spatial images comprise color coding indicating differences and similarities between content thereof.

10. The method according to claim 1, further comprising adding a mark or annotation to at least one of the plurality of non-spatial images in response to a user-software interaction.

11. The method according to claim 1, further comprising adding a mark or annotation to all of the plurality of non-spatial images that precede or succeed a selected one of the plurality of non-spatial images in a ranked order or a sorted order.

12. The method according to claim 1, further comprising exporting at least one of the plurality of non-spatial images that has a mark or annotation added thereto to a file or table.

13. A system for efficient comparative non-spatial image data analysis, comprising:
at least one electronic circuit configured to:
identify non-spatial images from a plurality of non-spatial images with first match scores equal to or greater than a pre-defined threshold value, where each first match score indicates an amount of matching between content of a respective non-spatial image of the non-spatial images and content of a reference non-spatial image;
rank the non-spatial images which were identified from the plurality of non-spatial images, where the ranking is based on at least one first attribute of the non-spatial images, and said first attribute comprises a second match score that indicates at least one of (a) how many minutiae points match each other or are common between at least two finger print images and (b) how many common minutiae points of the at least two finger print images have the same number of ridges connected thereto;
generate a screen page comprising an array defined by a plurality of cells in which at least two images of said non-spatial images are simultaneously presented in an order defined by said ranking thereof; and
display said screen page in a first GUI window of a display screen;
wherein each of said plurality of cells comprises only one of said plurality of non-spatial images.

14. The system according to claim 13, wherein said plurality of non-spatial images are further ranked by a second attribute that comprises a computed metric that specifies an amount of content of the respective non-spatial image of said plurality of non-spatial images that matches content of the reference non-spatial image.

15. The system according to claim 13, wherein said electronic circuit is further configured to display in said first GUI window at least said first attribute associated with a selected one of said plurality of non-spatial images that is presented therein.

16. The system according to claim 13, wherein said electronic circuit is further configured to change content of a second GUI window to include a non-spatial image of a selected one of said plurality of non-spatial images that is presented in said first GUI window.

17. The system according to claim 13, wherein said electronic circuit is further configured to replace a selected image of said plurality of non-spatial images that is presented in said first GUI window with an edited version of said selected image.

18. The system according to claim 13, wherein said electronic circuit is further configured to sort or filter said plurality of non-spatial images based on at least one second attribute thereof.

19. The system according to claim 18, wherein said second attribute comprises a print type, a number of minutiae, minutiae characteristics, a number of ridges, a number of broken ridges, a presence of a core in a fingerprint, an area of a fingerprint, a contrast of an image, a brightness of an image, an intensity of an image, a number of pores that are in a fingerprint, or a number of pores of a fingerprint that were filled.

20. The system according to claim 13, further comprising toggling content of a particular cell contained in the displayed screen page between two different non-spatial images, wherein said two different non-spatial images comprise a candidate fingerprint image and a reference fingerprint image.

21. The system according to claim 13, further comprising toggling content of a particular cell contained in the displayed screen page between two different non-spatial images, wherein said two different non-spatial images comprise indications indicating differences and similarities between content thereof.

22. The system according to claim 13, wherein said electronic circuit is further configured to add a mark or annotation to at least one of the plurality of non-spatial images in response to a user-software interaction.

23. The system according to claim 13, wherein said electronic circuit is further configured to add a mark or annotation to all of the plurality of non-spatial images that precede or succeed a selected one of the plurality of non-spatial images in a ranked order or a sorted order.

24. The system according to claim 13, wherein said electronic circuit is further configured to export at least one of the plurality of non-spatial images that has a mark or annotation added thereto to a file or table.

25. The method according to claim 1, wherein the minutiae comprises at least one of ridge endings, spurs, and bifurcations.

26. The method according to claim 1, further comprising:
receiving a user input for selectively toggling content of one particular cell of the plurality of cells contained in the displayed screen page between two different non-spatial images; and
in response to the reception of the user input, toggling the content of the particular cell between the two different non-spatial images, while content of all other cells of the screen page remains unchanged.

* * * * *